(12) United States Patent
Daw et al.

(10) Patent No.: US 11,184,672 B2
(45) Date of Patent: Nov. 23, 2021

(54) SYNCHRONIZING CONTENT PROGRESS

(71) Applicant: Comcast Cable Communications, LLC, Philadelphia, PA (US)

(72) Inventors: Julian Daw, Manchester, NH (US); Bill Wayda, Bensalem, PA (US); David Chacon-Gonzalez, Wesley Chapel, FL (US); Ravikumar Guttula, Malvern, PA (US); Shawn Canga, Antelope, CA (US); Jeffrey D. Ollis, Dresher, PA (US); Jason Deschenes, Hudson, NH (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/673,155

(22) Filed: Nov. 4, 2019

(65) Prior Publication Data
US 2021/0136447 A1 May 6, 2021

(51) Int. Cl.
| | |
|---|---|
| H04N 21/442 | (2011.01) |
| H04N 21/431 | (2011.01) |
| H04N 21/43 | (2011.01) |
| H04W 4/14 | (2009.01) |
| H04N 21/8549 | (2011.01) |
| H04N 21/488 | (2011.01) |
| H04L 29/06 | (2006.01) |
| H04N 21/41 | (2011.01) |
| H04N 21/472 | (2011.01) |

(52) U.S. Cl.
CPC ... *H04N 21/44218* (2013.01); *H04N 21/4302* (2013.01); *H04N 21/4314* (2013.01); *H04N 21/4316* (2013.01); *H04N 21/4882* (2013.01); *H04N 21/8549* (2013.01); *H04W 4/14* (2013.01)

(58) Field of Classification Search
CPC ......... H04N 21/44218; H04N 21/4302; H04N 21/4314; H04N 21/4316; H04N 21/4882; H04N 21/8549; H04N 21/42201; H04N 21/4223; H04N 21/25841; H04N 21/441; H04N 21/4415; H04W 4/14
See application file for complete search history.

(56) References Cited

U.S. PATENT DOCUMENTS

| | | |
|---|---|---|
| 6,782,551 B1 | 8/2004 | Entwistle |
| 6,925,610 B2 | 8/2005 | Thurston et al. |

(Continued)

FOREIGN PATENT DOCUMENTS

| | | |
|---|---|---|
| EP | 1454484 B1 | 9/2004 |
| EP | 1901475 A2 | 3/2008 |

(Continued)

OTHER PUBLICATIONS

European Office Action—EP Appl. 11166793.7—dated Oct. 8, 2015.

(Continued)

*Primary Examiner* — Alexander Gee
(74) *Attorney, Agent, or Firm* — Banner & Witcoff, Ltd.

(57) ABSTRACT

Systems, apparatuses, and methods are described for managing and synchronizing viewing progress of a content item by multiple users. In one implementation, a user returning to a joint viewing session may be presented with options for catching up to other users in the joint viewing session, or otherwise see what the returning user previously missed.

19 Claims, 16 Drawing Sheets

(56) References Cited

U.S. PATENT DOCUMENTS

| | | | |
|---|---|---|---|
| 7,509,663 B2 | 3/2009 | Maynard et al. | |
| 7,624,416 B1 | 11/2009 | Vandermolen et al. | |
| 7,680,959 B2 | 3/2010 | Svendsen | |
| 7,757,250 B1 | 7/2010 | Horvitz et al. | |
| 8,095,432 B1 | 1/2012 | Berman et al. | |
| 8,180,804 B1 | 5/2012 | Narayanan et al. | |
| 8,291,321 B2 | 10/2012 | Matsubayashi | |
| 8,302,127 B2 | 10/2012 | Klarfeld et al. | |
| 8,397,257 B1 | 3/2013 | Barber | |
| 8,554,640 B1 | 10/2013 | Dykstra et al. | |
| 8,555,177 B1 | 10/2013 | Junee et al. | |
| 8,677,415 B2 | 3/2014 | Angiolillo et al. | |
| 8,692,763 B1 | 4/2014 | Kim | |
| 8,793,735 B2 | 7/2014 | VanDuyn et al. | |
| 9,147,000 B2 | 9/2015 | Vasudevan et al. | |
| 9,183,523 B2 | 11/2015 | Cudak et al. | |
| 9,246,613 B2 | 1/2016 | McKee et al. | |
| 9,247,300 B2 | 1/2016 | Oddo et al. | |
| 9,342,576 B2 | 5/2016 | Saito et al. | |
| 9,407,751 B2 | 8/2016 | Hansen et al. | |
| 9,426,509 B2 | 8/2016 | Ellis et al. | |
| 9,554,163 B2 | 1/2017 | Ellis et al. | |
| 9,832,501 B2 | 11/2017 | Ruffini et al. | |
| 10,063,927 B1* | 8/2018 | Singh | H04N 21/47205 |
| 2002/0004742 A1 | 1/2002 | Willcocks et al. | |
| 2002/0004748 A1 | 1/2002 | Koga et al. | |
| 2002/0085024 A1 | 7/2002 | White et al. | |
| 2002/0152224 A1 | 10/2002 | Roth et al. | |
| 2002/0152459 A1 | 10/2002 | Bates et al. | |
| 2003/0084448 A1 | 5/2003 | Soundararajan | |
| 2003/0145338 A1 | 7/2003 | Harrington | |
| 2003/0233278 A1 | 12/2003 | Marshall | |
| 2004/0031046 A1 | 2/2004 | Weinblatt et al. | |
| 2004/0122736 A1 | 6/2004 | Strock et al. | |
| 2004/0203901 A1 | 10/2004 | Wilson et al. | |
| 2004/0230484 A1 | 11/2004 | Greenlee | |
| 2004/0244030 A1 | 12/2004 | Boyce et al. | |
| 2005/0049858 A1 | 3/2005 | Busayapongchai | |
| 2005/0192000 A1 | 9/2005 | Lloyd | |
| 2006/0031882 A1 | 2/2006 | Swix et al. | |
| 2006/0041478 A1 | 2/2006 | Zheng | |
| 2006/0048184 A1 | 3/2006 | Poslinski et al. | |
| 2006/0143236 A1 | 6/2006 | Wu | |
| 2006/0143653 A1 | 6/2006 | Suh | |
| 2006/0149617 A1 | 7/2006 | Yamashita et al. | |
| 2006/0156329 A1 | 7/2006 | Treese | |
| 2006/0176398 A1 | 8/2006 | Kang | |
| 2006/0225088 A1 | 10/2006 | Gulla | |
| 2006/0277100 A1 | 12/2006 | Parham | |
| 2007/0061863 A1 | 3/2007 | Rajasekaran | |
| 2007/0192723 A1 | 8/2007 | Anzelde et al. | |
| 2007/0196795 A1 | 8/2007 | Groff | |
| 2007/0207780 A1 | 9/2007 | McLean | |
| 2007/0294131 A1 | 12/2007 | Roman et al. | |
| 2008/0055272 A1 | 3/2008 | Anzures et al. | |
| 2008/0083001 A1 | 4/2008 | Peacock et al. | |
| 2008/0177617 A1 | 7/2008 | Gupta | |
| 2008/0209229 A1 | 8/2008 | Ramakrishnan et al. | |
| 2008/0243733 A1 | 10/2008 | Black | |
| 2008/0276273 A1 | 11/2008 | Billmaier et al. | |
| 2008/0320139 A1 | 12/2008 | Fukuda et al. | |
| 2009/0019375 A1 | 1/2009 | Garofalo | |
| 2009/0083116 A1 | 3/2009 | Svendsen | |
| 2009/0083779 A1 | 3/2009 | Shteyn et al. | |
| 2009/0089352 A1 | 4/2009 | Davis et al. | |
| 2009/0100463 A1 | 4/2009 | St. John-Larkin | |
| 2009/0119294 A1 | 5/2009 | Purdy et al. | |
| 2009/0132935 A1 | 5/2009 | Van Zwol | |
| 2009/0144635 A1 | 6/2009 | Miyazaki et al. | |
| 2009/0158326 A1 | 6/2009 | Hunt et al. | |
| 2009/0172161 A1 | 7/2009 | Singh | |
| 2009/0216577 A1 | 8/2009 | Killebrew | |
| 2009/0281888 A1 | 11/2009 | Zai et al. | |
| 2009/0300670 A1 | 12/2009 | Barish | |
| 2010/0023506 A1 | 1/2010 | Sahni et al. | |
| 2010/0058376 A1 | 3/2010 | Alhadeff et al. | |
| 2010/0083115 A1 | 4/2010 | Park | |
| 2010/0122207 A1 | 5/2010 | Kim et al. | |
| 2010/0138867 A1 | 6/2010 | Wong et al. | |
| 2010/0162289 A1 | 6/2010 | Sanders | |
| 2010/0229212 A1 | 9/2010 | Liu et al. | |
| 2010/0241699 A1 | 9/2010 | Muthukumarasamy et al. | |
| 2010/0250341 A1 | 9/2010 | Hauser | |
| 2010/0251305 A1 | 9/2010 | Kimble et al. | |
| 2010/0318611 A1 | 12/2010 | Curtin et al. | |
| 2010/0325544 A1 | 12/2010 | Alhadeff et al. | |
| 2010/0325646 A1 | 12/2010 | Alhadeff et al. | |
| 2010/0332330 A1 | 12/2010 | Goel et al. | |
| 2011/0035445 A1 | 2/2011 | Eickhoff | |
| 2011/0072452 A1* | 3/2011 | Shimy | H04N 21/4532 725/25 |
| 2011/0124408 A1 | 5/2011 | Ward | |
| 2011/0154213 A1 | 6/2011 | Wheatley et al. | |
| 2011/0161148 A1 | 6/2011 | Schmidt | |
| 2011/0184792 A1 | 7/2011 | Butcher et al. | |
| 2011/0264494 A1 | 10/2011 | Lechowicz | |
| 2011/0276882 A1 | 11/2011 | Buehler et al. | |
| 2011/0312375 A1 | 12/2011 | Kim et al. | |
| 2012/0047008 A1 | 2/2012 | Alhadeff et al. | |
| 2012/0064820 A1 | 3/2012 | Bemmel | |
| 2012/0089705 A1 | 4/2012 | French et al. | |
| 2012/0243850 A1 | 9/2012 | Basra et al. | |
| 2013/0011114 A1* | 1/2013 | Tashiro | G11B 27/105 386/230 |
| 2013/0046772 A1 | 2/2013 | Gu et al. | |
| 2013/0057765 A1 | 3/2013 | Zeleznikar | |
| 2013/0103628 A1 | 4/2013 | Skelton et al. | |
| 2013/0125161 A1 | 5/2013 | Herby et al. | |
| 2013/0297447 A1 | 11/2013 | Sakata | |
| 2013/0322850 A1 | 12/2013 | Chang et al. | |
| 2014/0019902 A1 | 1/2014 | DeLuca et al. | |
| 2014/0033240 A1 | 1/2014 | Card, II | |
| 2014/0046660 A1 | 2/2014 | Kamdar | |
| 2014/0130076 A1 | 5/2014 | Moore et al. | |
| 2014/0132524 A1 | 5/2014 | Lee | |
| 2014/0149424 A1 | 5/2014 | Kalmes et al. | |
| 2014/0215506 A1 | 7/2014 | Kalmes et al. | |
| 2014/0331260 A1 | 11/2014 | Gratton | |
| 2014/0344848 A1* | 11/2014 | Busse | H04N 21/466 725/28 |
| 2015/0003595 A1 | 1/2015 | Yaghi et al. | |
| 2015/0012416 A1 | 1/2015 | Woods | |
| 2015/0066652 A1 | 3/2015 | Collins et al. | |
| 2015/0121408 A1 | 4/2015 | Jacoby et al. | |
| 2015/0133164 A1 | 5/2015 | Song et al. | |
| 2015/0143394 A1 | 5/2015 | Hijikata et al. | |
| 2015/0148005 A1 | 5/2015 | Chau et al. | |
| 2015/0169189 A1 | 6/2015 | Want et al. | |
| 2015/0195621 A1 | 7/2015 | Harron et al. | |
| 2015/0199708 A1 | 7/2015 | Ying et al. | |
| 2015/0287219 A1 | 10/2015 | Liang et al. | |
| 2015/0319468 A1 | 11/2015 | Park et al. | |
| 2015/0350709 A1 | 12/2015 | Tomita | |
| 2016/0019934 A1* | 1/2016 | Mese | G11B 27/30 386/241 |
| 2016/0063998 A1 | 3/2016 | Krishnamoorthy et al. | |
| 2016/0170709 A1* | 6/2016 | Jang | G06F 3/167 715/727 |
| 2017/0182283 A1* | 6/2017 | Palmateer | H04N 21/47 |
| 2017/0257669 A1* | 9/2017 | Liu | H04N 21/2668 |
| 2019/0075374 A1* | 3/2019 | Panchaksharaiah | H04N 21/8549 |
| 2020/0351550 A1* | 11/2020 | Korupolu | H04N 21/4333 |

(56) References Cited

U.S. PATENT DOCUMENTS

2020/0374146 A1* 11/2020 Chhabra .............. G06Q 10/101
2020/0409519 A1* 12/2020 Faulkner ............ H04N 21/4312

FOREIGN PATENT DOCUMENTS

| WO | 2007143562 A2 | 12/2007 |
| WO | 2011002572 A1 | 1/2011 |

OTHER PUBLICATIONS

Canadian Office Action—CA Application No. 2740650—dated Feb. 28, 2017.
European Summons to Oral Proceedings—EP Appl. 11166793.7—dated Apr. 12, 2017.
Feb. 2, 2018—Canadian Office Action—CA 2,740,650.
EP 11166793.9-221 Search Report dated Aug. 5, 2011.
Entertainment Fiend: Keep Track of Watched TV Show Episodes and Movies and Plan What to Watch! dated Apr. 11, 2008, http://entertainmentfiend.blogspot.com/2008/04/keep-track-of-watched-tv-show-episodes.html, retrieved Jul. 31, 2014, 4 pages.
Entertainment Fiend: Keep Track of Watched TV Show & Movies and Plan What to Watch—Updated for 2011 Edition, dated Oct. 13, 2011, http://entertainmentfiend.blogspot.com/2011/10/keeping-track-of-watched-tv-shows.html, retrieved Jul. 31, 2014, 2 pages.
Alan Henry. How to Track All Your TV Shows So You Never Miss an Episode, Lifehacker, http://lifehacker/how-to-track-all-your-tv-shows-so-you-never-miss-an-epi-1180239026, 2013, 11 pages.
Thorin Klosowski. Netflix Profiles Ensure Roommates Won't Mess Up Your Recommendations, Lifehacker, http://lifehacker.com/netflix-profiles-ensure-roommates-wont-mess-up-your-re-987927584, dated Aug. 1, 2013, 11 pages.
Feb. 21, 2019—Canadian Office Action—CA 2,740,650.

* cited by examiner

DAY 1

Display Device 300

Scene 1

User B

User A

| User A | Scene 1 | Scene 1 |
| User B | | |

0        A1        END

Markers

SYNCHRONIZING CONTENT PROGRESS

BACKGROUND

Today's consumer enjoys a wealth of content available for consumption. Movies, television and streaming programs, Internet audio and/or video programs, and the like are all available, and their delivery requires computational and storage resources. Improving the efficiency with which those resources are used remains an ever-present goal of content delivery networks.

SUMMARY

The following summary presents a simplified summary of certain features. The summary is not an extensive overview and is not intended to identify key or critical elements.

Systems, apparatuses, and methods are described for helping to manage content consumption by multiple users in a system, such as multiple family members who may be watching together or in separate remote locations. Features herein may assist with synchronizing content progress of multiple users in a same content item (e.g., progress made as different users watch a television program series, movie, etc.). The system may maintain, for a user or group of users, information indicating that user's individual or relative progress in consuming content, such as a user's viewing history of a particular video program. The viewing history of the program may comprise one or more stop markers indicating where in the program the user stopped consuming the program. The viewing history of the program may comprise one or more resume markers indicating where in the program the user resumed consuming the program. If the system determines that a user wants to consume a program, the system may compare the user's viewing history of the program with those of other users in the same system (e.g., family members, housemates, etc.). If the system determines that the user is behind in viewing the program compared to one or more of the other users, the system may provide one or more options for the user to catch up with the other user(s). If the system determines that the user is about to pass another user's farthest viewing progress point, the system may generate a warning and provide an option to stop viewing the program at the other user's farthest viewing progress point. As such, the system may synchronize viewing progress of multiple users, and help to minimize duplicative streaming of the same content, thereby conserving transmission resources.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
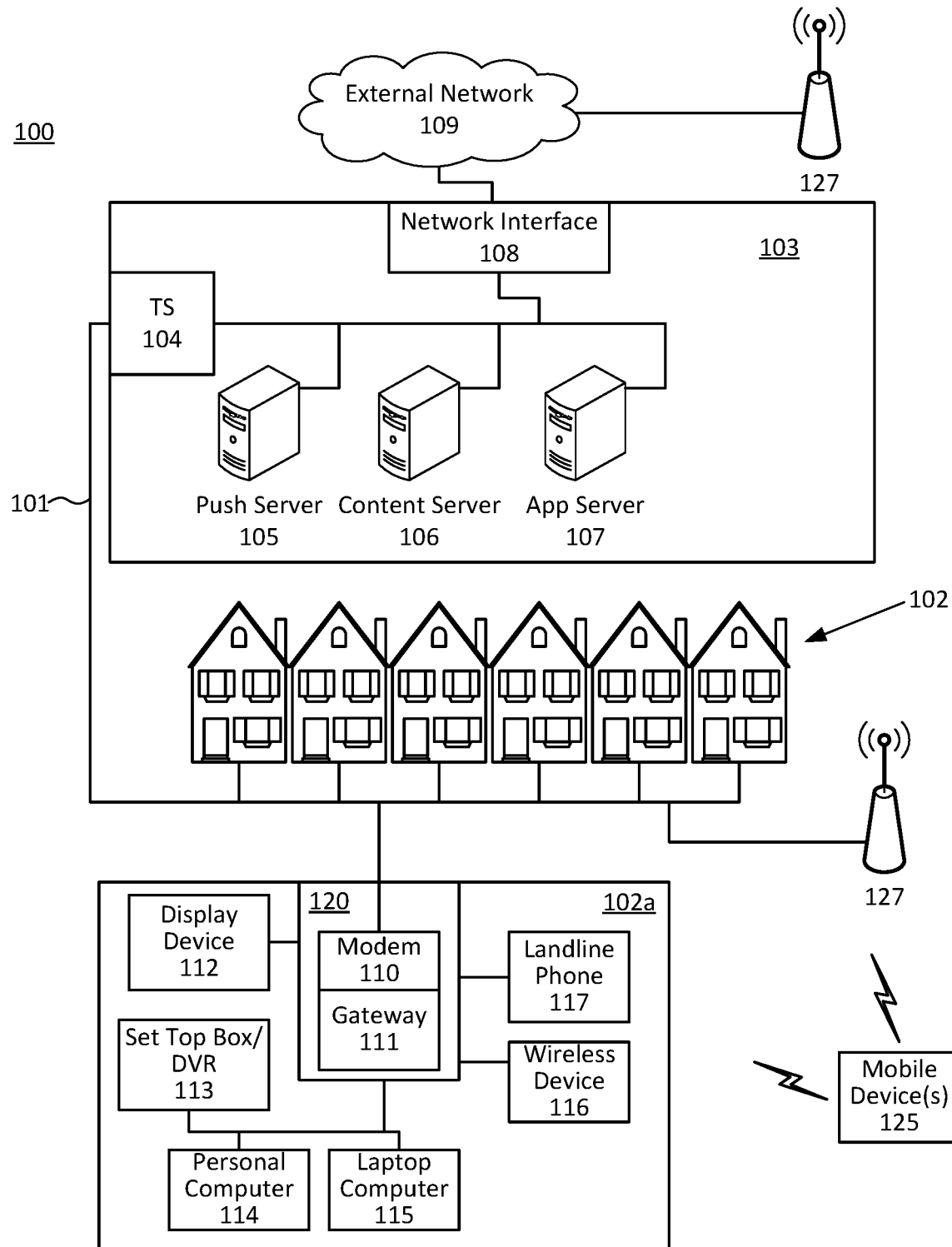
FIG. 1 shows an example communication network.

The accompanying drawings show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and back-end devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. Video content may comprise information displayed (or displayable) to a user in the form of one or more images. Video content may have associated audio content, e.g., information presented (or presentable) to a user in audio form. Video content may be communicated or stored in the form of data. Video content data providing a digital representation of a particular video content may be created using any of various encoding types. Such encoding types include, but are not limited to, compression according to a Motion Picture Experts Group (MPEG) standard (e.g., MPEG-2), compression according to the ITU-T H.264 (ISO/IEC MPEG-4) advanced video coding (AVC) standard, High Efficiency Video Coding (HEVC) standard (e.g., H.265 and MPEG-H Part 2), etc.

MPEG-2, AVC, or HEVC encoding may use motion vector-based compression to efficiently represent the stream of image frames. Using this compression, each frame is categorized as either an independent frame or a dependent frame. Independent frames are represented in the stream by data that is sufficient to generate the frame's complete image without knowledge about neighboring frames in the stream, similar to how a still image picture may be represented. Dependent frames may be represented by data that refers to, or depends on, another frame (e.g. a preceding frame, a subsequent frame, etc.). The first frame after a scene change is typically represented using an independent frame. In the MPEG-2, AVC, or HEVC standard, independent frames are referred to as Intra-coded picture frames (I-frames), while dependent frames are referred to as either Predicted picture frames (P-frames), or a Bi-directional predicted picture frames (B-frames). A P-frame is dependent on a prior frame in the stream, while a B-frame is dependent on both a prior and a subsequent frame in the stream.

The content server 106 (or, alternatively, an authentication server) may comprise software to validate user identities and entitlements, to locate and retrieve requested content (e.g., movies, video program series, etc.), and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. Although shown separately, the push server 105, the content server 106, the application server 107, and/or other server(s) may be combined. The servers 105, 106, 107, and/or other servers, may be computing devices and may comprise memory storing data and also storing computer executable instructions that, when executed by one or more processors, cause the server(s) to perform steps described herein. The content delivery system may comprise one or more of the push server 105, the content server 106, the application server 107, and/or other server(s). The content delivery system may track the viewing histories of multiple users and synchronize viewing progresses of the multiple users in a same content item (which will be discussed below).

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions (TVs)), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g. Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices (e.g., smart watches) may receive, store, output, and/or otherwise use assets. An asset may comprise a video, a game, one or more images, software, audio, text, webpage(s), and/or other content.

One or more presence tracking systems may be separate from the mobile devices 125, one or more of the devices in the premises 102a, and/or the other devices described above. Alternatively or in addition, one or more of the mobile devices 125, one or more of the devices in the premises 102a, and/or the other devices described above may comprise one or more presence tracking systems (e.g., facial recognition systems, voice recognition systems, biometrics, or any other systems) that may detect that a human (e.g., a user) is present in front of (e.g., in the vicinity of) a corresponding device. The corresponding device may send data indicating presence of the user. For example, the display device 112 may comprise a facial recognition system. The facial recognition system may comprise a camera capturing a facial image of a user, and may compare facial features of the captured facial image to known facial features pre-stored in a database. If a match is determined, the facial recognition system may identify the user. If the facial recognition system identifies the user, the facial recognition system may determine that the user is present. The facial recognition system may send presence data indicating that the user is present in front of the display device 112 to the content delivery system via the wired or wireless connections.

The set top box/DVR 113 may comprise a voice recognition system. The voice recognition system may comprise a microphone detecting a human sound, and may identify a user by comparing sound characteristics (e.g., sound intensity, sound peak, sound frequency, sound duration, and/or other sound characteristics) of the detected human sound to known sound characteristics pre-stored in a database. If a match is determined, the voice recognition system may identify the user. If the voice recognition system identifies the user, the voice recognition system may determine that the user is present. The voice recognition system may send presence data indicating that the user is present in front of the set top box/DVR 113 to the content delivery system via the wired or wireless connections.

The mobile device 125 may comprise a biometrics system to detect presence of an authorized user. The biometrics system may capture a user's fingerprint via a touch screen of the mobile devices 125, and may compare patterns of the captured fingerprint with patterns of known fingerprints pre-stored in a database. If a match is determined, the biometrics system may identify the authorized user, and the mobile device 125 may be unlocked. If the biometrics system identifies the user, the biometrics system may determine that the authorized user is present. The biometrics system may send presence data indicating that the authorized user is present in front of the mobile device 125 to the content delivery system via the wired or wireless connections.

One or more of the devices in the premises 102a described above may determine presence of a user based on connections with the mobile device 125 (and/or smart watches) associated with the user. For example, the personal computer 114 may periodically (e.g., every 5 seconds) scan for signals from a user's mobile device (and/or signals from the user's smart watch). If the personal computer 114 detects signals from the user's mobile device (and/or signals from the user's smart watch), the personal computer 114 may further determine, based on parameters (e.g., strength, direction, etc.) of the detected signals, a position of the user's mobile device (and/or the user's smart watch) relative to the personal computer 114. The personal computer 114 may determine that the user is present in front of the personal computer 114 if the user's mobile device (and/or the user's smart watch) is located within a predetermined distance (e.g., 1 meter) from the personal computer 114. The personal computer 114 may send presence data indicating that the user is present in front of the personal computer 114 to the content delivery system via the wired or wireless connections.

Figure 2:
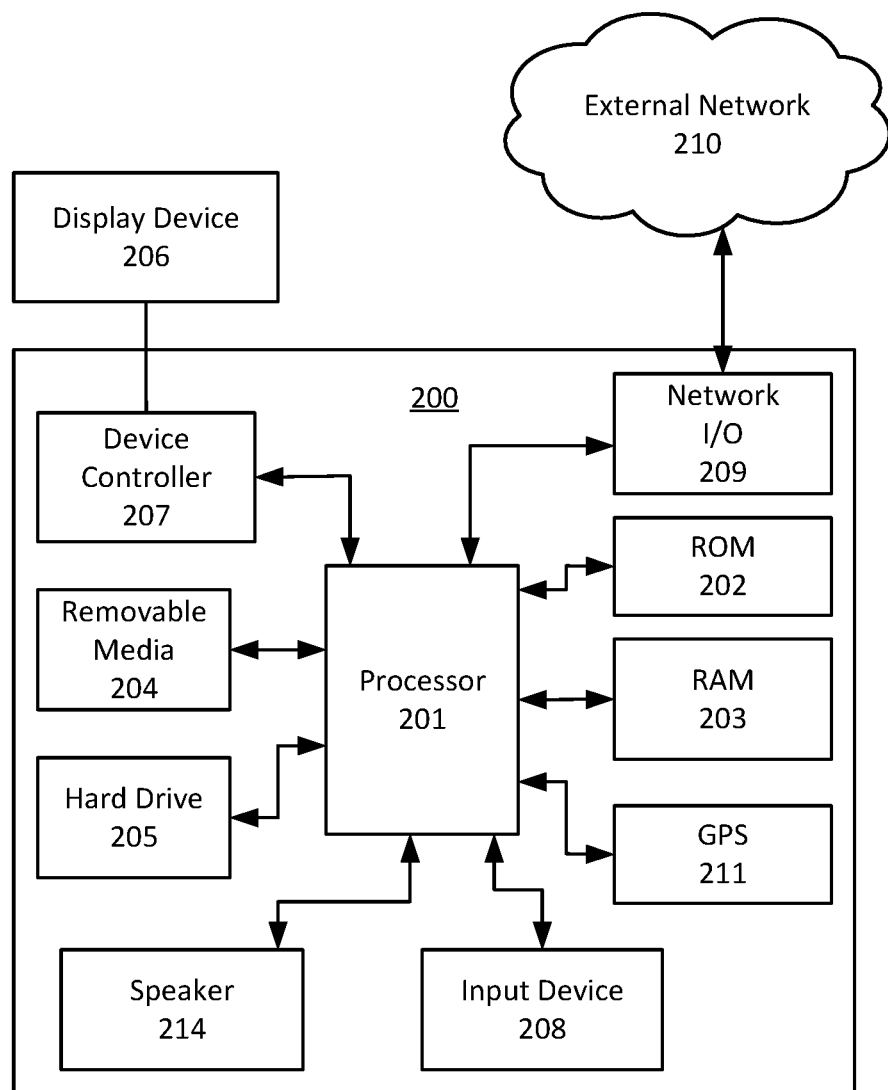
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein. The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), a microphone, a camera, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Multiple users may start consuming a same content item by using a same rendering device. For example, multiple users may start watching a video program together on a display device located in a room. During the video program, while other users are still watching the video program, one of the multiple users may leave the room and stop watching the video program for a time period (e.g., a restroom break). After the time period, the user may return to the room and continue to watch the video program with the other users. The returning user may want to watch scene(s), of the video program, that the returning user missed during the user's absence, and may want to catch up with the other users. FIG. 3A through FIG. 3F show an example where the content delivery system (hereafter "the system") determines what a user missed in the video program during the user's absence, and provides options for the user to catch up with other users.

Figure 3A:
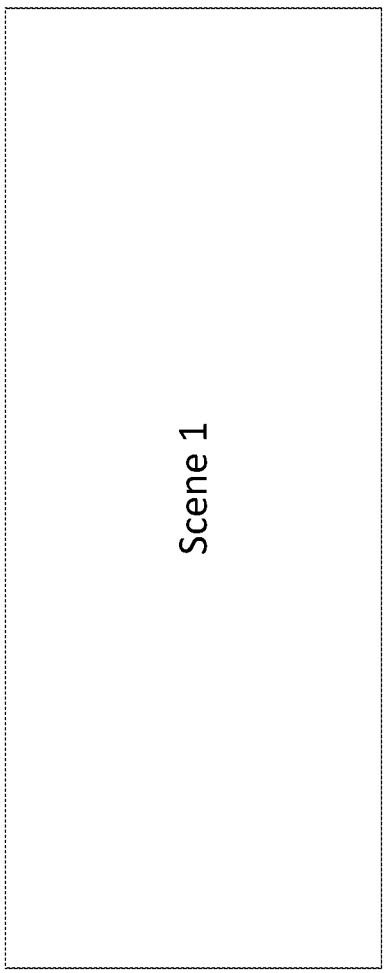
FIG. 3A through FIG. 3F show catch-up options for a returning user to catch up with other users.
Figure 3A:
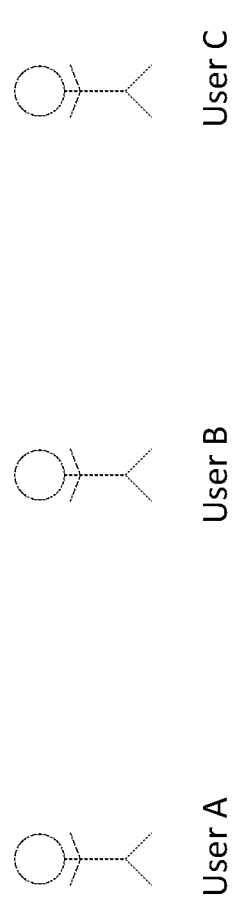

FIG. 3A shows that multiple users (e.g., User A, User B, and User C) start watching a video program (e.g., a movie, an Internet streaming program, a television program, etc.) together on a display screen of a display device 300 (e.g., a television, a monitor, etc.). The multiple users and the display device 300 may reside in a same physical location (e.g., in a same room, be housemates or roommates, family members, etc.). The video program may comprise a series of scenes (e.g., scene 1, scene 2, . . . scene N) arranged in a sequence. One or more presence tracking systems may track the presence of the User A, the User B, and the User C, and may send presence data indicating presence of the User A, the User B, and the User C to the system. For example, if the User A, the User B, and the User C start watching the video program in front of the display device 300, the presence tracking systems associated with the display device 300 may determine that the User A, the User B, and the User C are present in front of the display device 300, and the presence tracking systems may send presence data indicating that the User A, the User B, and the User C are present in front of the display device 300. The system may receive a program request for the video program. Based on the received presence data and the program request, the system may determine that the User A, the User B, and the User C are present in front of the display device 300 and start watching the video program together. As shown in FIG. 3A, the system may determine that the User A, the User B, and the User C start watching the video program together on the display screen of the display device 300 from the scene 1.

Figure 3B:
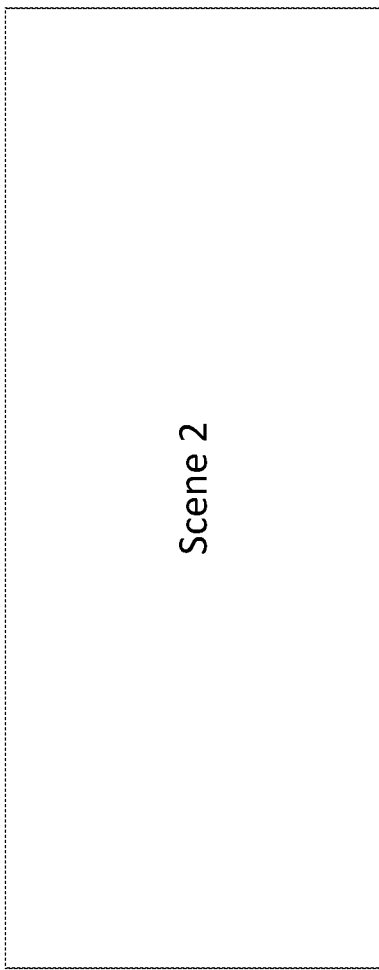

FIG. 3B shows that the User C leaves the room and stops watching the video program, while the User A and the User B are still watching the video program. For example, the User C may leave the room to answer a telephone call. If the User C leaves the room, one or more presence tracking systems associated with the display device 300 may send presence data indicating that the User A and the User B are present, and the User C is absent. The system may determine that at the time the User C leaves the room, the User C stops watching the video program. The system may generate a stop marker indicating a point, in the video program, that the User C has stopped watching. The stop marker may comprise data indicating a position, a time, or a location, in the stream of the video program, indicating when a user (e.g., the User C) has stopped watching the video program. The stop marker may be stored in a local or remote database that is accessible by the system. For example, the system may determine that the User C left the room at the beginning of the scene 2, and may generate a stop marker, for the User C, pointing to the beginning of the scene 2. As shown in FIG. 3B, the User C leaves the room at the beginning of the scene 2, and the User A and the User B continue to watch the scene 2.

Figure 3C:
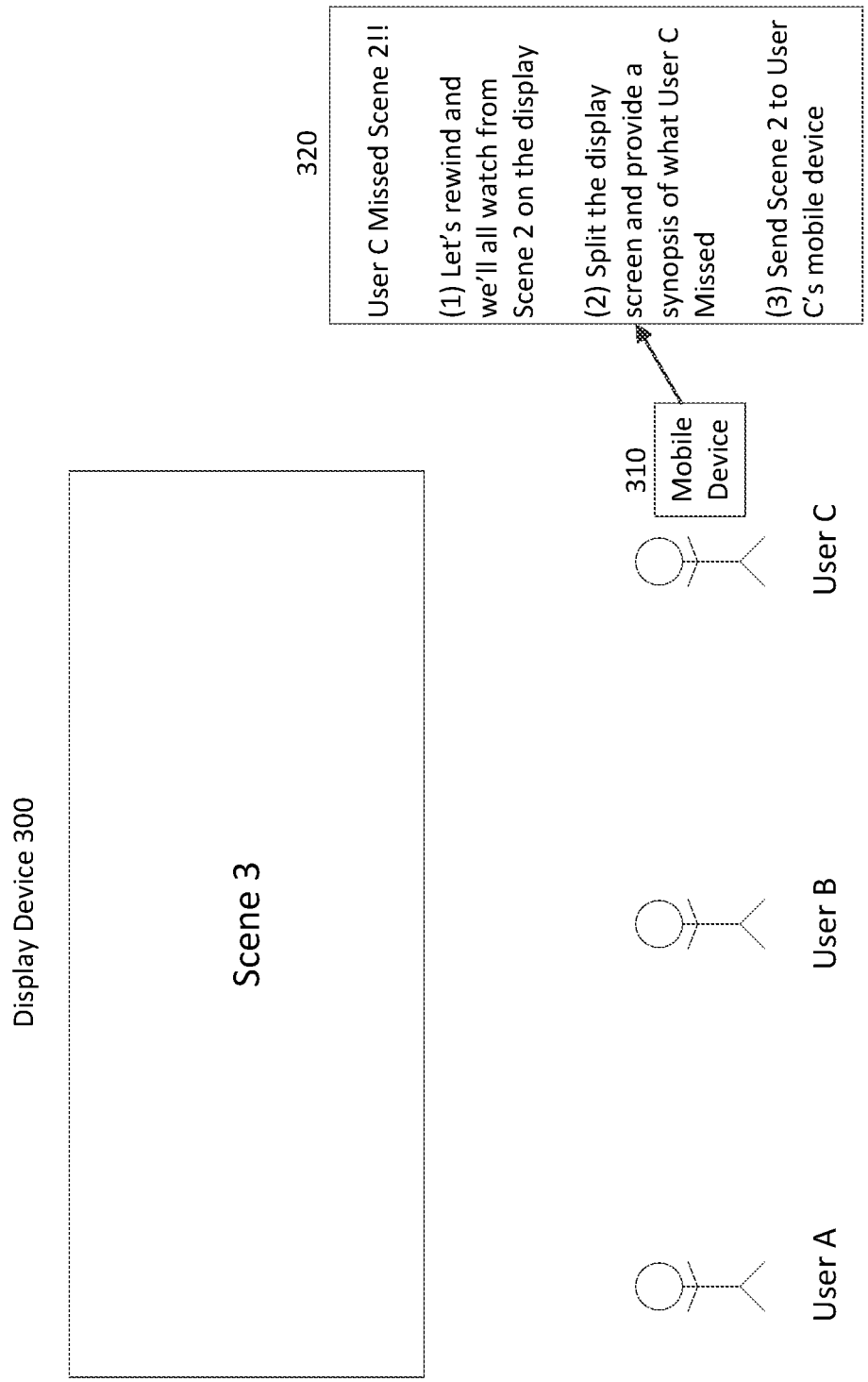

FIG. 3C shows that after the User C returns to the room, the system may provide one or more catch-up options for the User C to choose to catch up with the User A and the User B. At the time the User C returns to the room in the FIG. 3C example, the User A and the User B have viewed the entire scene 2 and start watching the scene 3. The system may receive presence data indicating that the User C is now present in front of the display device 300. Compared to the previously received presence data which indicated that the User C was absent, the system may now determine that the User C has returned to the room to resume watching the video program. Based on the time point at which the User C returns to the room and other users' current viewing progress points of the video program, the system may generate a resume marker, for the User C, to indicate where in the stream of the video program the user C resumes watching the video program. The resume marker may comprise data indicating a position, a time, or a location, in the stream of the video program, indicating where a user (e.g., the User C) has resumed watching the video program. The resume marker may be stored in a database that is accessible by the system. For example, the system may determine that the User C comes back at 9:40 PM; and at 9:40 PM, the User A and the User B start to watch the scene 3. The system may determine that the resume marker, for the User C, points to the beginning of the scene 3. The system may determine that the gap between the stop marker and the resume marker is the entire scene 2, and may determine that the User C missed the entire scene 2 during the User C's absence. The system may send data indicating that the User C missed the entire scene 2 to a device associated with the User C (e.g., the User C's mobile device 310). Based on the received data, the User C's mobile device 310 may display a message (e.g., "User C Missed Scene 2!!") on a touch screen 320 of the mobile device 310. The User C's mobile device 310 may display one or more of catch-up options for the User C to choose to catch up with the User A and the User B.

As shown in FIG. 3C, the User C's mobile device 310 may display three catch-up options: (1) rewinding the video program, on the display screen of the display device 300, to the beginning of what the user C missed (e.g., the mobile device may display—"Let's rewind and we'll all watch from Scene 2 on the display"); (2) splitting the display screen of the display device 300 and providing a synopsis of what the User C missed (e.g., the mobile device may display—"Split the display screen and provide a synopsis of what User C Missed"); and (3) sending the scene 2 to a device associated with the user C (e.g., the mobile device may display—"Send Scene 2 to User C's mobile device."). The User C may select one of these options. For example, the User C may click on one of these options on the touch screen 320 of the User C's mobile device 310. The system may receive data indicating the user's selection.

Figure 3D:
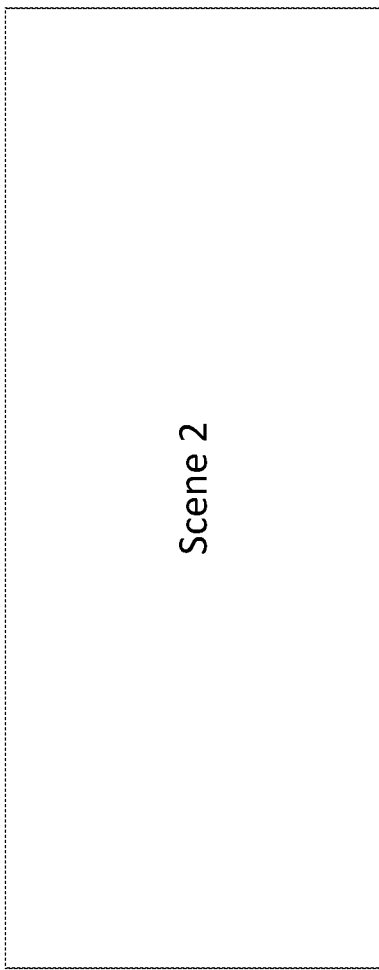
Figure 3D:
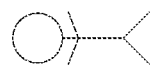
Figure 3D:
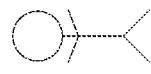
Figure 3D:
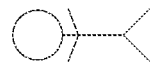

FIG. 3D shows a situation where the User C selects the above option (1). If the User C selects option (1), the system may cause the display device 300 to rewind the video program to the beginning of the scene 2. The display device 300 may display the video program from the beginning of the scene 2. The User A and the User B may watch the scene 2 one more time with the user C. The display device 300 may retrieve a copy of the scene 2 saved in a local memory (e.g., a display buffer) of the display device 300 and render the local copy of the scene 2 one more time, thereby saving bandwidth by eliminating needs of retrieving the scene 2 from a remote content source.

Figure 3E:
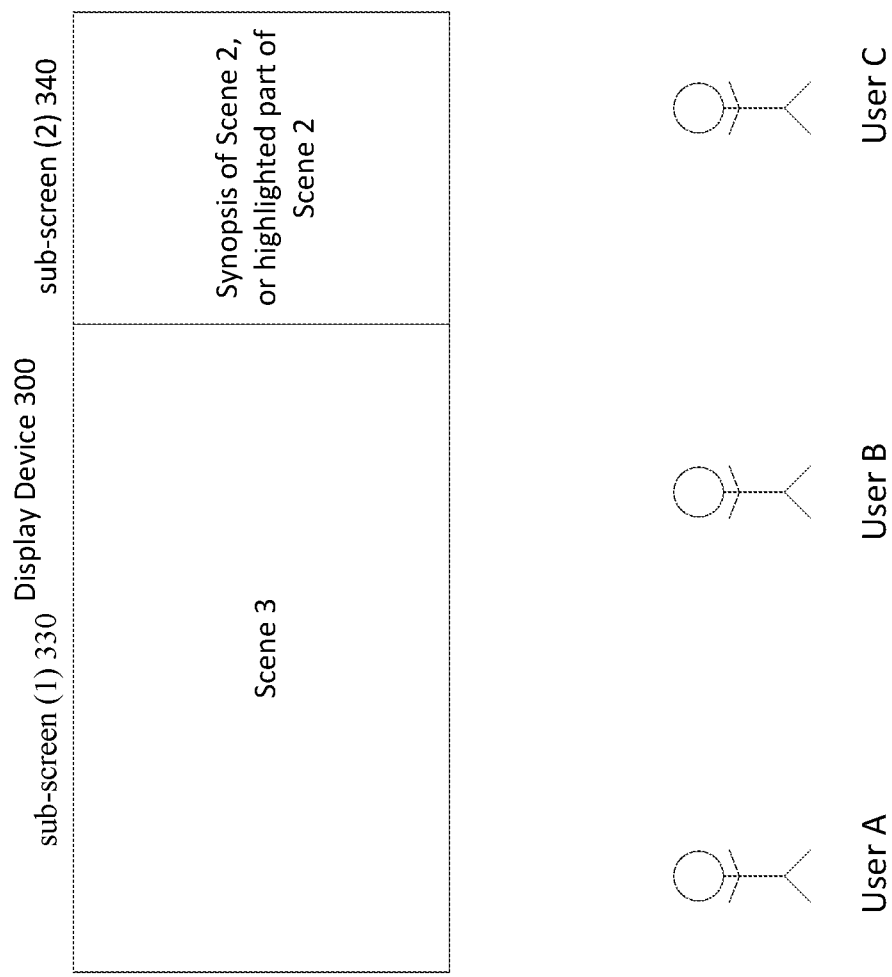

FIG. 3E shows a situation where the User C selects the above option (2). If the User C selects option (2), the system may cause the display device 300 to split the display screen into a sub-screen (1) 330 and a sub-screen (2) 340. The display device 300 may display the scene 3 on the sub-screen (1) 330, and may display a synopsis of the scene 2 or highlighted parts of the scene 2 on the sub-screen (2) 340. The synopsis of the scene 2 may comprise one or more of text summary of the scene 2, a number of video frames that represent summary of the content associated with the scene 2, and/or other information summarizing the scene 2. The system may retrieve data indicating the synopsis of the scene 2 from metadata embedded in the stream of the video program. The highlighted parts of the scene 2 may comprise video clips (with audio content disabled) of the scene 2 that interested the User A and/or User B. For example, when the User A and the User B were watching the scene 2 during the User C's absence, at least one of the User A and the user B may have cheered when watching these video clips. The facial recognition systems and/or the voice recognition systems previously discussed may detect cheers, may send data (e.g., time periods during which the cheers occur) associated with the cheers to the system, and the system may determine, based on the data associated with the cheers, video clips associated with the cheers. The system may tag these video clips as highlighted portions of the scene 2. As such, the User C may watch the scene 2 (what the User C has missed during the User C's absence) on the sub-screen (2) 340, and may watch the scene 3 displayed on the sub-screen (1) 330 together with the User A and the User B.

Figure 3F:
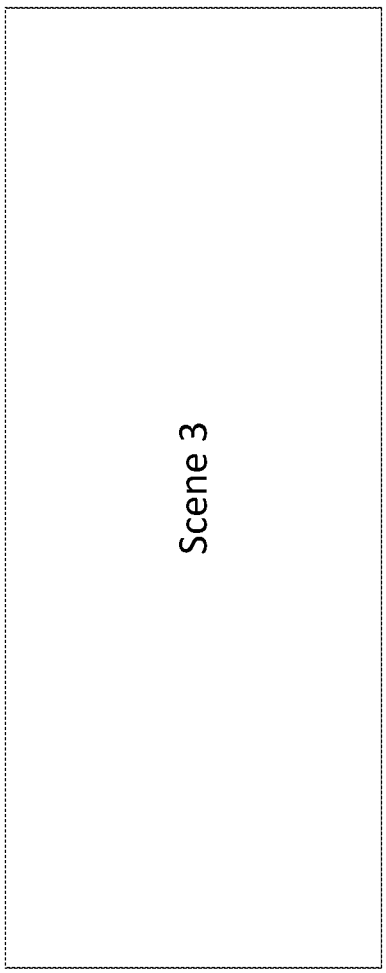

FIG. 3F shows a situation where the User C selects the above option (3). If the User C selects option (3), the system may send the scene 2 (what the User C missed during the User C's absence) to the User C's mobile device 310. The User C's mobile device 310 may display the scene 2 on the screen. The User C may watch the scene 2 on the mobile device 310. As the display device 300 continues to display the video program from the scene 3, the User C may also watch the scene 3 on the display device 300 with the User A and the User B.

If the User C watches the scene 2 on the User C's mobile device 310, the User C may perform rewind, pause, fast forward, or any other trick plays on the mobile device 310. The system may determine how to execute the trick plays based on the User C's user profile. The User C's user profile may comprise the User C's viewing preferences. The User C's viewing preferences may indicate that the User C prefers fast forwarding the content at a speed of 5× (e.g., 5 times faster than the scene 2 is usually played). If the User C selects to fast forward the scene 2, the system may cause the User C's mobile device 310 to fast forward the scene 2 at speed of 5×.

The system may omit commercial content associated with the scene 2 before sending the scene 2 to the User C's mobile device 310 for display. The system may provide an option (e.g., a "Skip Commercial" button displayed on the User C's mobile device 310) to skip the commercials. The system may send different commercials to the User C's mobile device 310 based on the User C's user profile. For example, the system may have previously embedded local car dealership commercials in the scene 2 when the User A and the User B were watching the scene 2 during the User C's absence. When sending the scene 2 to the User C's mobile device 310, the system may embed movie advertisements, instead of local car commercials, in the scene 2 based on the User C's user profile indicating movies as one of the User C's habits. The commercials shown during scene 2 on the mobile device may be different from the commercials that appeared when scene 2 was initially shown on the main display.

FIG. 4A through FIG. 4F show examples of timelines of progress for different users as they watch a program, and the timelines may comprise markers that may be stored to assist in synchronizing viewing progress between multiple users. Multiple users may start watching a same video program, but may later have different viewing progresses. The system may track and synchronize the viewing progresses of the multiple users.

Figure 4A:
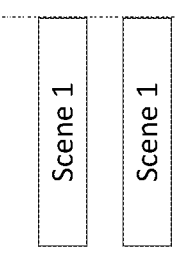
FIG. 4A through FIG. 4F show examples of markers that may be stored to assist in synchronizing viewing progress between multiple users.
Figure 4A:

As shown in FIG. 4A, on DAY 1, multiple users (e.g., User A and User B) may start watching a video program together on the display screen of the display device 300. The video program may include a series of scenes (e.g., scene 1, scene 2, scene 3, scene 4, and scene 5) arranged in a sequence. The video program may have a time length from 0 to END, and each of the scenes may have a respective time length. In this example, the video program is a 150-minute show, and each scene includes 30 minutes of content. The video program may be an any time length show, and a scene may include any time length of content. At 9 PM, the User A and the User B may start watching the video program together from 0 (e.g., the beginning of the scene 1). The system may determine that the start marker of the video program is 0. If the video program starts, the system may determine, based on received presence data, that the User A and User B are present and are watching the video program together. The User A and the User B may watch the video program together until 9:30 PM. At 9:30 PM, the User A and the User B complete the scene 1.

Figure 4B:
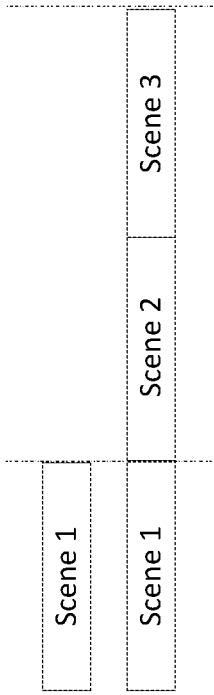
Figure 4B:
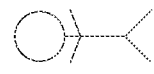

As shown in FIG. 4B, at 9:30 PM, the User A may leave the room, and the User B may continue to watch the video program. At the time the User A leaves the room, the system may timestamp a first stop marker (e.g., A1), for the User A, indicating that the User A stops watching the video program at A1. For example, the system may determine that the User A has watched the first 30-minutes (e.g., the scene 1) of the video program, and first stop marker (A1) for the User A is 30 minutes after the start marker of the video program. During the User A's absence, the User B may continue to watch the scene 2 and the scene 3 until 10:30 PM. At 10:30 PM, the User B may leave the room and stop watching the video program. After the User B leaves the room, the system may timestamp a first stop marker (e.g., B1), for the User B indicating that the User B stopped watching the video program at B1. For example, the system may determine that the User B has watched the first 90-minutes (e.g., the scenes 1-3) of the video program, and may determine that the first stop marker (B1) for the User B is 90 minutes after the start marker of the video program. The system may determine that the User A's farthest viewing progress point of the video program is A1, and that the User B's farthest viewing progress point of the video program is B1.

Figure 4C:
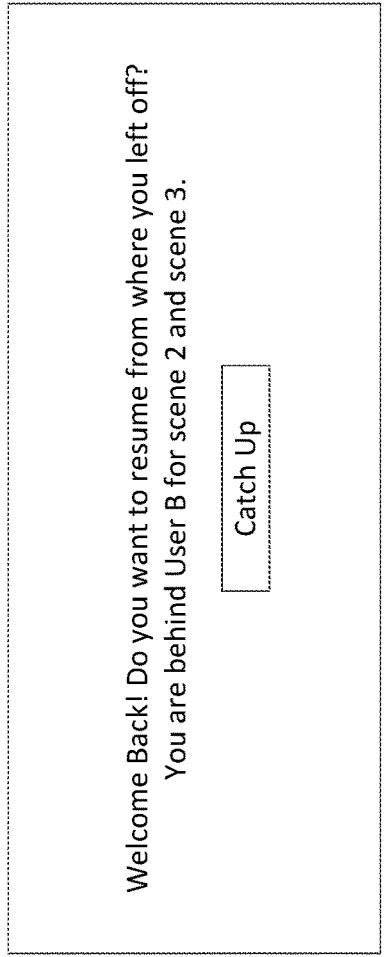
Figure 4C:
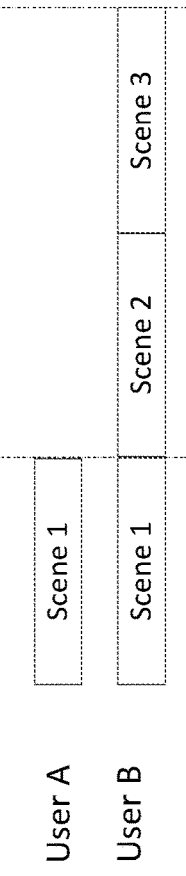
Figure 4C:
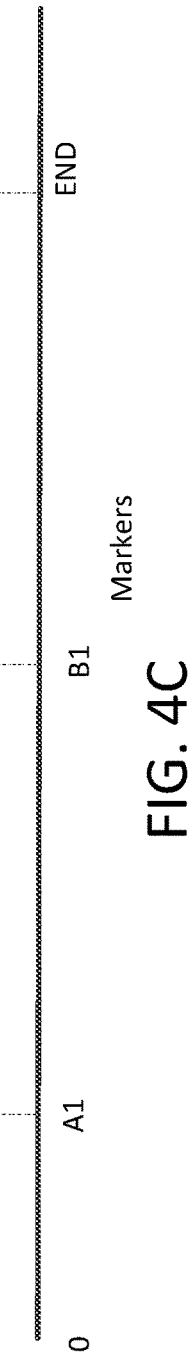

As shown in FIG. 4C, on DAY 2, only the User A comes back and continues to watch the video program. The system may determine that the User A is present but the User B is absent (e.g., missing). The system may provide an option on the display screen of the display device 300 and ask the User A whether to continue to watch the video program. The system may cause the display device 300 to display viewing progress of the User A and the User B. For example, the display screen may display a text message—"Welcome Back! Do you want to resume where you left off? You are behind the user B for scene 2 and scene 3." The system may provide an option for the User A to select to catch up with the User B. For example, the system may cause the display device 300 to display a "Catch Up" button on the display screen of the display device 300. If the User A clicks on the "Catch Up" button, the system may cause the display device 300 to resume displaying the video program on the display screen from A1 to B1. If the User A does not click on the "Catch Up" button, the system may cause the display device to display one or more of content of the last tuned channel, a program guide, etc. on the display screen of the display device 300.

Figure 4D:
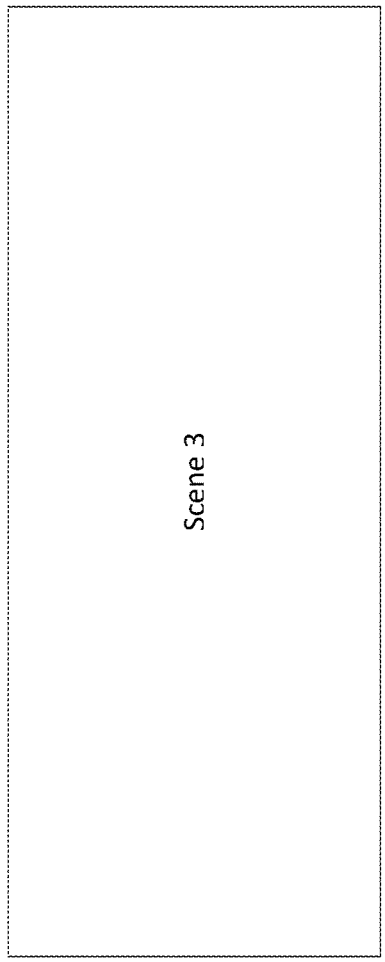
Figure 4D:
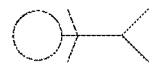

The User A may click on the "Catch up" button. As shown in FIG. 4D, the display device 300 may resume displaying the video program from the beginning of the scene 2 until the User A's current viewing progress point reaches B1 (e.g., the end of the scene 3). As such, the User A may continue to watch the video program from where the User A left (e.g., A1) to where the User B left (e.g., B1).

Figure 4E:
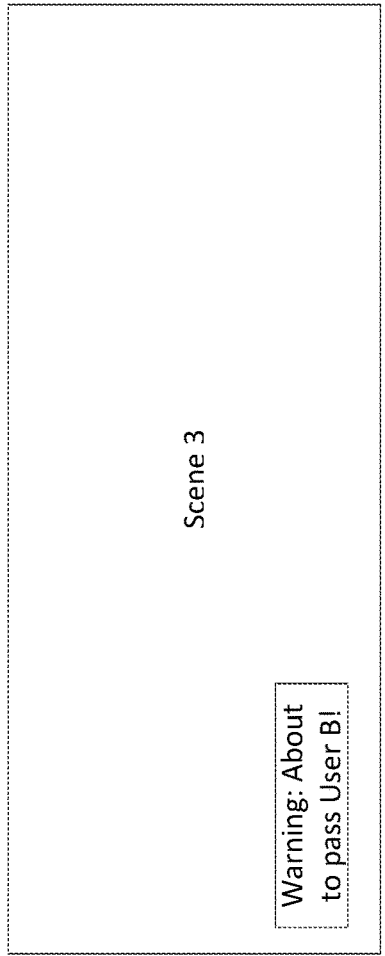
Figure 4E:
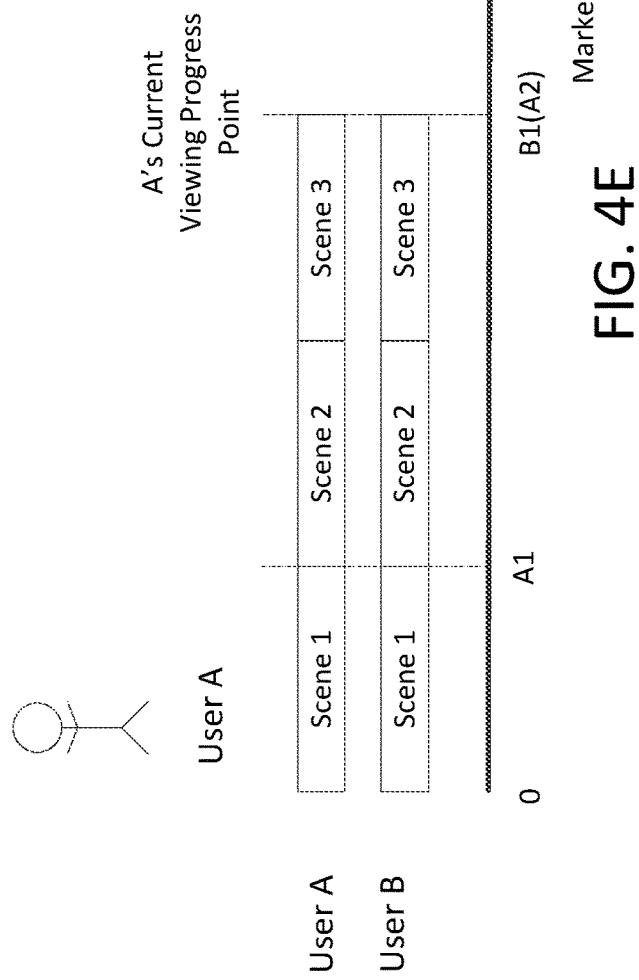

As shown in FIG. 4E, if the User A's current viewing progress point reaches B1, the system may cause the display device 300 to display a warning that the User A is about to pass the User B's farthest viewing progress point. The warning may be displayed at a corner of the display screen of the display device 300 so that most part of the scene displayed on the display screen of the display device 300 is not blocked by the warning. The warning may be displayed at any portion of the display screen of the display device 300. For example, the display screen of the display device 300 may display a warning message—"Warning: About to pass User B." The User A may be informed by such a warning that the User A is about to pass where the User B has stopped. After the User A sees the warning message, the User A may either do nothing and continue to watch the video program beyond the User's last stop marker (B1), or stop the video program.

In addition to causing display of the warning message, the system may cause the display device 300 to display an option to stop the video program at B1. For example, the display screen of the display device 300 may display the warning message—"Warning: About to pass User B," and may also display an option—"'Press ok' on remote if you want to stop. Otherwise, the show will continue in 10 seconds." If the User A presses the "ok" button on the remote, and the display device 300 may stop displaying the video program. If the User A does not press the "ok" button, the display device 300 may automatically continue to display the video program after 10 seconds. In this example, the User A may press the "ok" button on the remote, and stops where the User B has stopped.

As shown in the timeline of FIG. 4E, if the User A stops at where the User B has stopped, the system may timestamp a second stop marker (A2) for the User A. The second stop marker (A2) may be identical to the first stop marker (B1) for the User B. The system may determine that, of all the markers (e.g., A1 and A2), A2 is the farthest stop marker associated with the stream of the video program, and may determine that A2 is the farthest viewing progress point of the User A. The system may determine that the user B's farthest viewing progress point of the video program remains same as B1. After the display device 300 stops displaying the video program, the User A may stop watching the video program and leave the room.

Figure 4F:

As shown in FIG. 4F, on DAY 3, both of the User A and the User B may come back and may continue to watch the video program together. The system may determine that both of the User A and the User B are present in front of the display device 300. The system may cause the display device 300 to display a list of programs for the User A and the User B to select. For each of the programs in the list, the User A and the User B have not completed the program and have same viewing progress. If the User A and the User B choose to continue to watch the program indicated in FIGS. 4A-4E, the system may retrieve the farthest stop marker (e.g., A2) for the User A and the farthest stop marker (e.g., B1) for the User B (where A2 is identical to B1). The system may send the stream of the video program, beginning from B1(A2), to the display device 300 for display. The system need not send the video program before B1(A2) because both of the User A and the User B have viewed the video program before B1 (A2). Omitting to send the video program before B1 (A2) may save bandwidth for content delivery. In some cases, the system may send the entire video program to the display device 300 but cause the display device 300 to resume displaying the video program from B1(A2). In these cases, the users may be able to rewind the video program to anywhere they want. As shown in FIG. 4G, the User A and the User B may continue to watch the video program together from B1 (A2) to the end of the video program (e.g., END).

A user may consume different parts of a video program on different types of rendering (e.g., displaying or playing) devices, respectively. The system may provide different formats for the different parts of the video program according to different types of rendering devices, respectively. In these cases, the system may implement adaptive bitrate streaming (ABR) wherein a video file may be encoded using MPEG-2, and may provide multiple resolution versions (e.g., versions encoded at 1080p resolution and at 4k resolution) for the video program. For example, a user may start watching a video program on display device D1 located in Room 1. The system may determine that the user starts viewing the video program on the display device D1 in Room 1. The system may determine that the display device D1 has a 1080p screen based on an identifier (e.g., a serial number) of the display device D1. The system may send a version of video content of the video program encoded at 1080p resolution to the display device D1 for display. In the middle of the video program, the user may leave Room 1 and enter Room 2. The system may timestamp a first stop marker (M1) to indicate that the user stops watching the video program at M1. After the user enters Room 2 and turns on a display device D2 in the Room 2, the system may determine that the user is present in front of the display device D2. When the display device D2 is turned on, the system may cause the display device D2 to display an option to continue to watch the video program on the display device D2. The user may enter a selection, by using a remote of the display device D2, to continue to watch the video program on display device D2. Based on the user selection, the system may retrieve the first stop marker (M1), and may continue to display the video program from M1 on the display device D2. The system may determine that the display device D2 has a 4k screen based on an identifier of the display device D2. The system may send a version of the video content of the video program encoded at 4k resolution to the display device D2 for display. Similarly, the system may provide different versions for audio content of the video program, and may send the respective versions of the audio content to the display device D1 and the display device D2 that match the respective audio setups of the display device D1 and the display device D2.

In some cases, if the system determines that a rendering device does not have the capability to render the video content of the video program, but does have the capability to render the audio content of the video program, the system may send an audio only version (e.g., a version where only the audio content of the video program is provided, or a version where the video content of the video program is disabled) of the video program to the rendering device. For example, a vehicle rendering device installed on a vehicle may have an audio output device but does not have a video output device. The system may determine, based on an identifier of the vehicle rendering device, that the vehicle rendering device is unable to render the video content of the video program but is able to render the audio content of the video program. The system may then send the audio only version of the video program to the vehicle rendering device for play. By doing so, the system may save bandwidth for content delivery by avoiding to send content that the rendering device is unable to render.

The system may automatically activate a rendering device located in a predetermined proximity to the user, and may cause the device to display/play the video program. For example, the user may have registered one or more rendering devices (e.g., the display device D1, the display device D2, a display device integrated to a refrigerator, a display device installed on the user's vehicle (e.g., the user's car), an audio system installed on the user's vehicle, or any other devices that may display/play video/audio content of the video program) with the system. The user may start watching the video program on the display device D1. When the display device D1 is turned on, the display device D1 may display a "Follow Me" button on the screen of the display device D1. If the user clicks on the "Follow Me" button, the "Follow Me" function may be activated. With the "Follow Me" function being activated, the system may automatically, without any user input, activate one or more of the registered rendering devices if the user is within a threshold distance from the one or more of the registered rendering devices. For example, the user may click on the "Follow Me" button on the display device D1. After the user watches a part of the video program on the display device D1, the user may leave the Room 1. The user may enter the Room 2 and may sit on a sofa that is located within 2 meters from the display device D2 that is in a sleep mode. One or more presence tracking systems in the Room 2 may detect that the user is within 2 meters from the display device D2, and may send, to the system, data indicating that the user is within 2 meters from the display device D2. Based on the data indicating that the user is within 2 meters from the display device D2, the system may send wake-up signals to the display device D2 and activate the screen of the display device D2, and the system may send the stream of the video program, from the first stop marker (M1), to the display device D2 for display. The threshold distance may vary according to different types of the registered devices. For example, the threshold distance for the display device integrated in the user's vehicle may be 0.3 meter.

The user may later leave Room 2 and enter the user's vehicle. The system may timestamp a second stop marker (M2) indicating that the user stops watching the video program at M2. Compare to M1, M2 points to a later point in the stream of the video program. The user's mobile device may connect to the vehicle via a wireless or wired connection. The user's mobile device may receive vehicle data, from the vehicle, indicating the vehicle identification, information of display devices installed on the vehicle, information of audio systems installed on the vehicle, etc. The user's mobile device may send the vehicle data to the system. Based on the received vehicle data, the system may determine that the user is present in the vehicle. The mobile device may detect (e.g., by using a camera) a relative physical location of the user within the vehicle, and may send data indicating the relative physical location of the user within the vehicle to the system.

The system may deliver the video program, from the second stop marker M2, to one or more of the user's mobile device or rendering devices installed in the vehicle in a vehicle mode. The vehicle mode may comprise (1) an audio only mode (e.g., a mode where only audio content of the video program is provided, or a mode where the video content of the video program is disabled), or (2) a video and audio mode (e.g., a mode where both of the audio content and the video content are provided and/or enabled). The system may determine the vehicle mode based on the physical location of the user within the vehicle. For example, if the system determines that the user sits on a rear seat (e.g., the user is not the driver), the system may send the stream of the video program, from M2, in the video and audio mode, to one or more of the user's mobile device or the rendering devices associated with the rear seat for display/play. Alternatively, if the system detects that the user sits on the driver seat of the vehicle (e.g., the user is the driver), the system may deliver the stream of the video program, from M2, to the user's mobile device or the rendering devices associated with the driver seat for display/play in the audio only mode. If the system delivers the stream of the video program in the audio only mode, the driver is unable to watch the video of the video program (because video content has been disabled), so distract from the video program to the driver may be decreased. In some cases, the system may determine, based on the vehicle data, that the vehicle only has an audio system and does not have a display device, the system may deliver the stream of the video program, from M2, in the audio only mode regardless where the user is located in the vehicle. In some cases, the user's mobile device may display one or more audio only options for the user to choose. The audio only options may comprise one or more of Alt audio portion radio, audio only, visually disabled feed, or second audio program (SAP).

In some cases, the user (e.g., a driver) may exit and return to the car multiple times when the user is listening the audio content of the video program via the audio system of the car. The user may turn off the audio system of the car when the user exits the car. The connection between the audio system and the user's mobile device may be disconnected. The system may generate a stop marker associated with the stream of the video program each time the connection is disconnected. The user may turn the audio system back on when the user returns to the car, and the audio system of the car may reconnect to the user's mobile device. If the audio system of the car reconnects to the user's mobile device, the system may continue to send the video program, from the farthest stop marker associated with the stream of the video program, in audio only mode to the audio system of the car for play. If the user returns to the Room 1 from the car, the system may send both of the video content of the video program and the audio content of the video program to the display device D1.

In some cases, even though the system detects that the user sits on the driver seat, the system may receive sensor data indicating that the vehicle is not in a driving operation mode. For example, the user may park the vehicle in a parking lot. Vehicle sensors may sense that the speed and acceleration of the vehicle are zero and the braking of the vehicle is activated. The vehicle sensors may generate sensor data indicating that the speed and acceleration of the vehicle are zero and the braking of the vehicle is activated. The vehicle sensors may send the sensor data to the system via the user's mobile device. The system may determine, based on the received sensor data, that the vehicle is not in the driving operation mode. After determining the vehicle is not in the driving operation mode, the system may re-enable the video content and send the video program in the video and audio mode to one or more of the user's mobile device or the rendering devices installed in the vehicle for display/play.

The system may synchronize the viewing progresses of multiple users (e.g., a User J and a User P) who want to watch a video program together even if the multiple users watch the video program on different devices, respectively. The User J and the User P may start watching a video program together on a display device located in a room. After a time period, the User J may leave the room. If the User J leaves the room, the system may timestamp a first stop marker (J1), for the User J, to indicate that the User J stops watching the video program at J1 in the stream of the video program. After the User J leaves the room, the User P may also leave room. The system may timestamp a first stop marker (P1), for the User P, to indicate the User P has stopped watching the video program at P1 in the stream of the video program. P1 may be ahead of J1. While the User P has stopped watching the video program after P1, the User J may continue to watch the video program, from J1, on the User J's mobile device. If the User J's current viewing progress point reaches P1, the User J's mobile device may display a warning indicating that the User J is about to watch content, of the video program, which the User P has not watched. The mobile device may display options for the User J to choose whether to stop at P1 or to pass beyond P1. If the User J chooses to stop at P1, the User J's mobile device may stop displaying the video program. In some cases, the system may omit providing the above options but force the User J's mobile device to stop displaying the video program if the User J's current viewing progress point reaches P1. Alternatively, if the User J chooses to go beyond P1, the User J's mobile device may continue to display the video program until the User J stops again at a second stop marker (J2) or until the video program ends. J2 may be ahead of P 1. The User P may continue to watch the video program on the User P's mobile device. If the User P's current viewing progress point reaches J2, the User P's mobile device may display a similar warning indicating that the User P is about to watch the content that the User J has not watched, and may display options for the User P to choose whether to stop at J2 or to pass beyond J2.

Figure 5A:
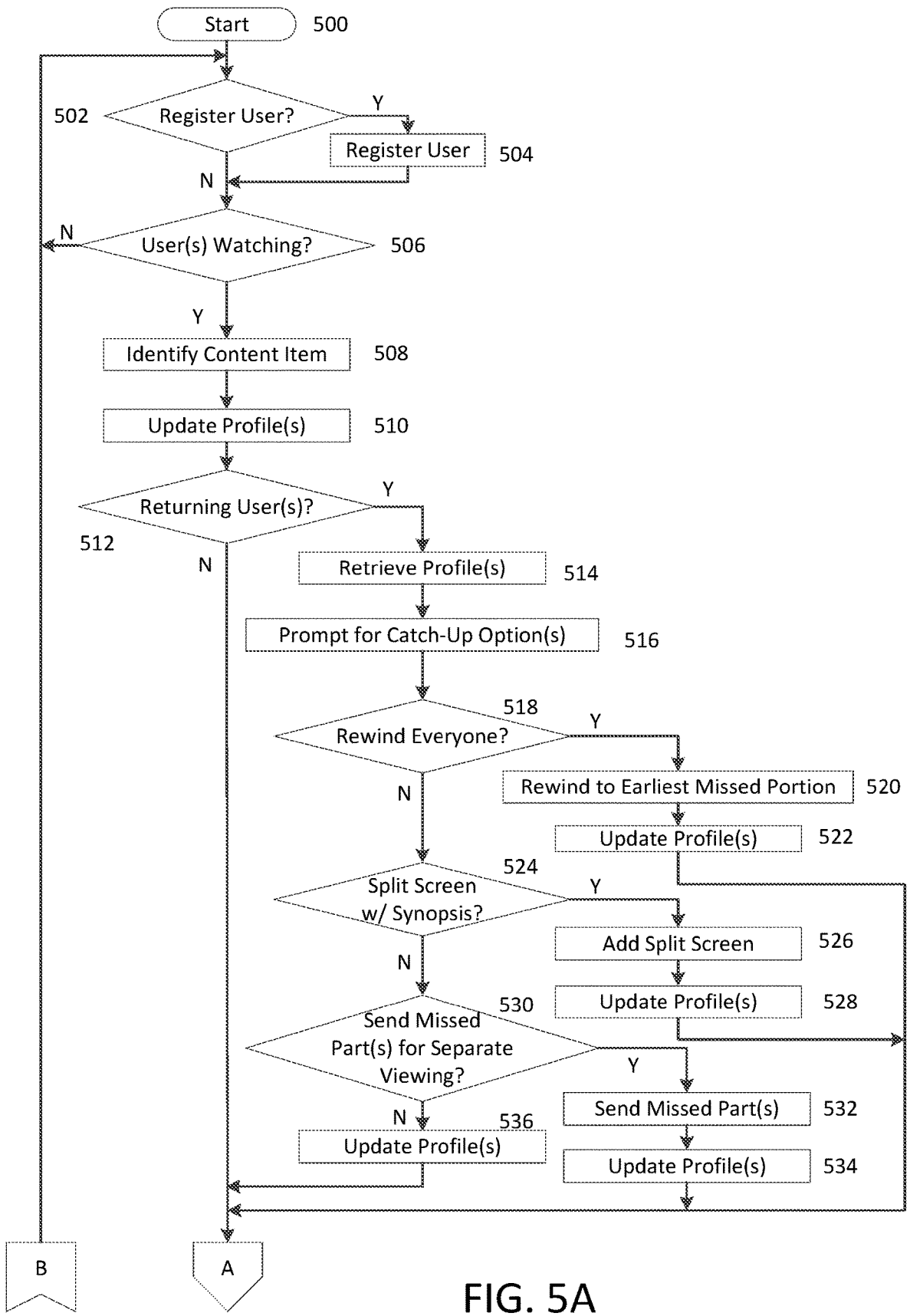
FIGS. 5A and 5B constitute a flow chart showing an example method for providing options for a returning user to catch up with other users and synchronizing viewing progress between multiple users.
Figure 5B:
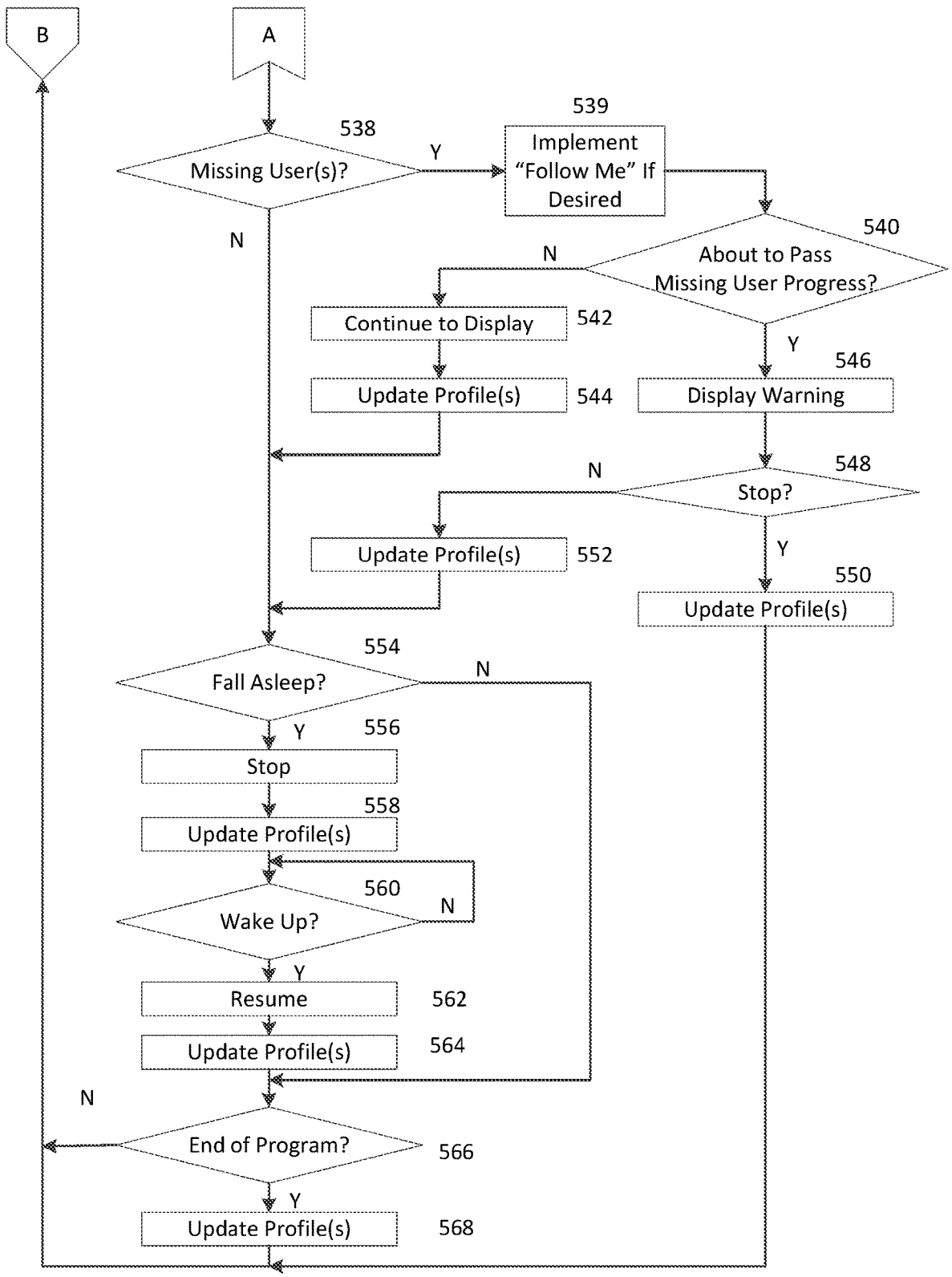

FIGS. 5A and 5B comprise a flow chart showing an example method for providing options for a returning user to catch up with other users and synchronizing viewing progress between multiple users. The method may start from step 500 where the system may be initialized. The system described herein, and the steps performed, may be embodied in one or more computing devices, such as application server 107, content server 106, gateway 111, display device 112, set-top box/DVR 113, computers 114-115, etc.

At step 502, the system may determine if the system receives a request to register a user. If the system receives such a request, the method may proceed to step 504. At step 504, the system may open or update an account according to the request. For example, one or more of multiple users associated with the premises 102a may request registering one or more of the multiple users with the system. The system may generate an account for the premises 102a. As another example, the system may add a new user to an existing account of the premises 102a. In some cases, the request may request removing a registered user from an account. In response to such a request, the system may remove the registered user from the account.

The account may comprise a premises profile of the premises 102a and a respective user profile of each of the one or more of the multiple users. The profile of the premises 102a may comprise one or more of an address of the premises 102a, billing information of the premises 102a, information of devices associated with the premises 102a (e.g., the modem 110, and the gateway 111, the display device 112, the set top box/DVR 113, the personal computer 114, the laptop computer 115, the wireless device 116, the landline phone 117, etc.), or any other information associated with the premises 102a.

The user profile may comprise one or more of the user's viewing history (e.g., program information of the user's current program, the user's current viewing progress point of the current program, program information of a corresponding program, the user's stop marker(s) associated with a stream of a corresponding program, the user's resume marker(s) associated with a stream of a corresponding program, the user's farthest viewing progress point of a corresponding program, device information of device(s) with which the user consumes a corresponding program, etc.); the user's personal information (e.g., user's viewing preferences, user's habits); information of the user's mobile device (e.g., the user's username associated with the mobile device, the user's mobile phone number, the device identification of the user's mobile device, etc.); information of the user's vehicle (e.g., the vehicle identification, information of di splay devices installed on the vehicle, information of audio systems installed on the vehicle, etc.); information of the user's selected display devices which the system may automatically activate when the user is within a predetermined distance from these devices (e.g., a television located in the premises 102a, a display device on a refrigerator located in the premises 102a, a display device integrated in the user's vehicle, etc.); or any other information associated with the user.

The program information of the user's current program may be information of the program that the user is currently requesting and/or is currently consuming. If the system determines that the user has stopped watching a program, the system may initialize the user's current program (e.g., setting the user's current program as "not available") until the user sends another program request and/or starts consuming a program. If the user's current program is "not available," the system may determine that the user is not currently consuming a program.

The user's current viewing progress point of the current program may be the point, in the stream of the current program, the user is currently consuming. The user's current viewing progress point may point to a frame, of the current program, which the user is currently viewing. If the system determines that the user has stopped watching a program, the system may initialize the user's current viewing progress point of the current program (e.g., setting the user's current viewing progress point of the current program as "not available") until the user starts consuming a program. If the user's current viewing progress point of the current program is "not available," the system may determine that the user is not currently consuming a program.

The program information of a program may comprise program information of any program that the user has consumed. For example, the program information may comprise the title of a program that the user has consumed, the address of the program located in a database, etc.

The user's stop marker(s) may point to where, in a stream of a corresponding video program, the user has stopped watched the program. One user may have multiple stop markers associated with the stream of one program if the user has stopped watching the program multiple times.

The farthest viewing progress point of a program may be the farthest viewing progress point that the user has consumed. The farthest viewing progress point may be same as the farthest stop marker, among all the stop markers associated with the stream of the program.

The user's resume marker(s) may point to where, in a stream of a corresponding video program, the user resumes to watch the program. For example, multiple users may start watching a same program, and one of the multiple users leaves in the middle of the program while other users continue to watch the program. The one of the multiple users may return and continue to watch the program. The resume marker points to where, in the stream of the program, other users are watching at the time the returning user returns to consume the program. The resume marker may point to the last I-frame that other users have consumed at the time the user returns to consume the program. One user may be associated with multiple resume markers if the user has resumed watching the program multiple times.

The device information of device(s) with which the user consumes a corresponding program may comprise device identification(s) (e.g., a device name, e.g., "TV 1," "Mobile," etc.; a MAC ID; a device serial number; or any unique information associated with a device) of the device(s) with which the user has used to consume the program. For example, the user may consume a program with one or more devices. The user may consume a part of the program (e.g., scene 1 of the program) on a laptop and may consume another part (e.g., scene 2 of the program) of the program on the user's smartphone or mobile device. The device information may comprise device information indicating a MAC ID of the laptop and the corresponding part of the program (e.g., the scene 1 of the program) that the laptop has rendered, and information indicating a MAC ID of the user's mobile device and the corresponding part of the program (e.g., the scene 2 of the program) that the user's mobile device has rendered. The device information may comprise a corresponding time period indicating when the device renders the corresponding part of the program.

A respective user account may be generated for each of the one or more of the multiple users, and the user accounts may be associated with each other. The user account may comprise a user profile of the corresponding user.

The user profile may comprise, among other data, data indicating an example viewing history shown in the following Table 1:

the Movie 1, the third row value for the TV Show 1, the TV Show 2, and the Movie 1 is not available (N/A).

The fourth row of the Table 1 may indicate the device with which the user is consuming the current program. For example, the user may be currently watching the Current Movie on a first television named "TV1." Since the user is not currently watching the TV Show 1, the TV Show 2, and the Movie 1, the fourth row value for the TV Show 1, the TV Show 2, and the Movie 1 is not available (N/A).

The fifth row of the Table 1 may indicate one or more stop markers and/or resume markers associated with each of the current program and programs that the user has watched. For example, for the Current Movie, the user has stopped at 30-minutes of the Current Movie, resumed at 40-minutes of the Current Movie, and stopped again at 90-minutes of the Current Movie. For the TV Show 1, the user has stopped at 60-minutes of the TV Show 1, resumed at 70-minutes of the TV Show 1, and stopped again at 100-minutes of the TV Show 1. For the TV Show 2, the user has watched the entire 180-minutes TV Show 2. For the Movie 1, the user has stopped at 58-minutes of the Movie 1.

The sixth row of the Table 1 may indicate the user's farthest viewing progress point of a corresponding program. For example, for the Current Movie, the farthest point the user has watched points to 90-minutes of the Current Movie. The farthest viewing progress point (90 minutes) of the Current Movie may be different from the current viewing progress (80 minutes) of the Current Movie, because a returning user (another user different from this user) may cause to rewind the Current Movie to an earlier point which this user has already watched (as shown in FIG. 3D). For the TV Show 1, the farthest point the user has watched may point to 100-minutes of the TV Show 1. For the TV Show 2, the farthest point the user has watched may point to 180-minutes of the TV Show 2. For the Movie 1, the farthest point the user has watched may point to 58-minutes of the Movie 1. In some cases, the farthest viewing progress point

TABLE 1

Viewing History

| Info | Current Movie | TV Show 1 | TV Show 2 | Movie 1 |
|---|---|---|---|---|
| Current Progress | 80 mins | N/A | N/A | N/A |
| Current Rendering Device | TV1 | N/A | N/A | N/A |
| Markers | Stop 1: 30 min<br>Resume 1: 40 min<br>Stop 2: 90 min | Stop 1: 60 min<br>Resume 1: 70 min<br>Stop 2: 100 min | Stop 1: 180 min | Stop 1: 58 min |
| Farthest | 90 min | 100 min | 180 min | 58 min |
| Past Rendering Device(s) | 0-30 min: TV1<br>30-40 min: Mobile<br>40-90 min: TV1 | 0-60 min: TV2<br>60-70 min: Mobile<br>70-100 min: TV2 | 0-180 min: Mobile | 0-58 min: TV2 |

The second row of the Table 1 may indicate the program information of program(s) that the user has watched. For example, the program information may include the program title—"Current Movie"—of the current program that the user is watching, and the program titles of programs that the user has watched—"TV Show 1," "TV Show 2," and "Movie 1."

The third row of the Table 1 may indicate the user's current viewing progress of the current program. For example, the user may be currently watching the Current Movie at 80-minutes of the Current Movie. Since the user is not currently watching the TV Show 1, the TV Show 2, and may be omitted from the Table 1. In these cases, the system may determine the farthest viewing progress point if the farthest viewing progress point is required to determine playback of the content item or other actions associated with the content item. For example, the system may determine the farthest viewing progress point is equal to the stop marker, of multiple stop markers (if the use has stopped watching the program for multiple times), that is farthest in the stream of the program.

The seventh row of the Table 1 may indicate the devices that have rendered a corresponding program. For example, for the Current Movie, the TV 1 previously displayed 0-30 minutes of the Current Movie, the user's mobile device named "Mobile" previously displayed 30-40 minutes of the Current Movie, and the TV 1 previously displayed 40-90 minutes of the Current Movie. For the TV Show 1, a second television named "TV 2" previously displayed 0-60 minutes of the TV Show 1, the Mobile previously displayed 60-70 minutes of the TV Show 1, and the TV 2 previously displayed 70-100 minutes of the TV Show 1. For the TV Show 2, the Mobile previously displayed the entire TV Show 2. For the Movie 1, the TV2 previously displayed 0-58 minutes of the Movie 1.

The values in the above Table 1 may be any values. Even not shown in the above Table 1, the viewing history may include any other information that is related to the user's viewing history. Data indicating the Table 1 may be stored in a database accessible by the system.

If no request to register a user is received, the method may proceed to step 506. At step 506, a determination may be made as to whether any of the registered users wants to consume a program on a device. For example, a registered user may sit in front of a display device located in the premises 102a and select a program to watch (e.g., tuning a channel, selecting an item from a program schedule or listing, requesting a streaming session, etc.). The user may send, via a user interface displayed on a screen of the display device, a program request for the program to watch. The system may receive the program request. The program request may indicate one or more of the user's selection of the program among a plurality of programs, or the user's acceptance of a recommendation of continuing to watch the program that the user has been previously watching.

As previously discussed, the display device may comprise a facial recognition system. The facial recognition system may identify the user. After the facial recognition system identifies the user, the facial recognition system may determine that the user is present in front of the display device. The facial recognition system may send data indicating presence of the user to the content delivery system via the wired or wireless connections. Based on the received program request and the received presence data, it may be determined that the user wants to watch the requested program on the display device.

It may be determined that a registered user wants to watch a program on the user's mobile device. For example, the user may unlock the user's mobile device with fingerprint authorization. The user's mobile device may determine that the user is present and may send presence data indicating that the user is present. The user may send a program request, via a video application installed on the user's mobile device, to request a program to watch. Based on the received presence data and the program request, the system may determine that a registered user wants to watch a program on the user's mobile device.

It may be determined that a registered user wants to listen to audio content of a program in the user's vehicle. For example, the user may enter the user's vehicle via fingerprint authorization, and may sit on the driver seat. The user's mobile device may determine that the user enters the vehicle and is a driver, and may send presence data indicating that the user enters the vehicle and is a driver. The user may turn on an audio system installed on the vehicle. The user may send a program request, via a user interface associated with the audio system, to request a program to listen to. Based on the received presence data and the program request, the system may determine that a registered user wants to listen to audio content of a program in the user's vehicle.

It may be determined that multiple registered users want to consume a same program on a same device (e.g., in a group viewing session). For example, the system may receive a program request via a user interface of a device (e.g., a display device), and may also receive presence data indicating presence of multiple registered users in front of the display device. Based on the received program request and the presence data, the system may determine that multiple registered users want to consume a same program on a same display device.

It may be determined that multiple registered users want to consume a same program on multiple different devices (e.g., in different remote locations), respectively (e.g., in a group viewing session). For example, the system may receive presence data indicating that one registered user is present in front of a display device and may receive a program request, via a user interface of the display device, for a video program. At the same time or within a predetermined time threshold (e.g., within 10 seconds), the system may receive presence data indicating that another registered user is present in front of the another registered user's mobile device and may receive a program request, via a user interface of the another registered user's mobile device, for the same video program. It may be determined that the one registered user and the another registered user want to consume a same program on different devices, respectively.

If the system does not receive a program request and/or presence data indicating presence of a registered user, it may be determined that none of the registered users wants to consume a program, the process returns to step 502.

If it is determined that one or more registered users want to consume a program, the process proceeds to step 508. At the step 508, the system may identify what program one or more registered users want to consume. For example, the program request may comprise data indicating program information (e.g., the program title, the address of program located in a database, etc.) that the user wants to consume. Based on the program information, the system may locate and retrieve requested program, encrypt the program, and to initiate delivery (e.g., streaming or downloading) of the program to one or more registered users requesting the program.

At step 510, the system may update the user profile, for each of the identified users who are currently watching, by, e.g., updating values in the Table 1, to indicate the current program being watched, which users are watching, and update their progress in the current program.

New entries may be added if the current program has not previously been viewed. The system may compare the program information of the user's current program (the program currently being viewed) to the program information, and may determine whether the current program matches any of the programs that the user has consumed. If a match is not determined, the system may determine that the current program has not been previously consumed by the user and the system may update the program information by adding the program information of the current program. Alternatively, if a match is determined, the system may determine that the user has previously consumed at least a part of the requested program, and a new entry need not be added.

Device information of device(s) with which the user consumes the current program may be updated. The system may exchange data signals with the display device and obtain an identifier of the display device (e.g., "TV1", "smartphone", etc.). The user profile (e.g., the "Current Rendering Device" field in Table 1) may be updated to indicate device information of the display device.

The system may update, for each of the current viewers, the user's progress associated with the current program. The current progress, farthest progress, stop/resume markers, and past rendering devices indicated in Table 1 may all be updated as needed. The profile may also be updated to indicate the various users in the current viewing session.

The system may cause the device (on which the user wants to consume the requested program) to display a user interface if needed to complete the updating process. The user may update the user profile (e.g., the user user's personal information, information of the user's mobile device, information of the user's vehicle, information of the user's selected display devices which the system may automatically activate if the "Follow Me" option is chosen, and any other information associated with the user) via the user interface. The user may update the user profile by inputting data via the user's interface. The system may update the user profile based on the user input.

At step 512, the system may determine whether any of the users is a returning user. A returning user may be a newly-detected user (e.g., a user who was newly-detected in step 506) who is returning from a short break (e.g., returning from a restroom break). To detect a returning user, a list of users identified in step 506 may be compared with a previous list of users identified in an earlier instance of step 506 (e.g., as the process continues to loop, step 506 will be revisited and repeated). If there is at least one new user who was not previously detected, and if there is also at least one other user who has remained watching the program (e.g., was detected in both the previous iteration of step 506 and the current iteration of step 506), then it may be determined that the new user is a potential returning user. However, before concluding that the new user is a returning user, the profile for the new user may be examined to determine if the new user's profile comprises a recent stop marker for the current program. The system may compare the new user's last stop marker (e.g., the most recent stop marker that the system generated for the new user) with the current viewing progress point of the current program being watched, and if the new user's stop marker is within a predetermined range of the current viewing progress point (e.g., if the stop marker was within the last ten minutes, twenty minutes, etc.), then the new user may be determined to be a returning user who is returning from a short break.

If it is determined that there is a returning user, the process may proceed to steps 514-536, which may provide one or more options for the returning user to catch up with the other users who are in the current viewing session. For example, as previously discussed in FIGS. 3A-3F, the system may provide one or more catch-up options for a returning user (e.g., the User C) to choose to catch up with other users (e.g., the User A and the User B) who are also consuming the same program as the User C.

At step 514, the system may retrieve the user profile of the returning user. For example, the system may determine, based on the profile, device information of a device (e.g., a display device) with which the returning user wants to consume the requested program. The system may also retrieve the returning user's last stop marker (e.g., the most recent stop marker that the system generated for the user) and the returning user's last resume marker (e.g., the most recent resume marker that the system generates for the user). The returning user's progress may be compared with the current program progress (and/or with the progress indicated by the profiles of other users in the current viewing session), and one or more missed scenes (scenes between the current progress and the returning user's farthest progress). The system may cause the display device to display an option to show what the returning user has missed (e.g., the gap between the returning user's last stop marker and the returning user's last resume marker). For example, the display device may display a "what did I miss" button on the screen of the display device. If the returning user presses the "what did I miss" button, the display device may display information of the gap between the returning user's most recent stop marker and the returning user's most recent resume marker. The information of the gap may comprise one or more of a time length of the gap (e.g., "You missed 30 minutes of the show!"), a content summary of the gap (e.g., "You missed the introduction of a solar system"), etc. If the returning user uses another device (e.g., the user's mobile device) to consume the program, the system may cause that other device to display this "what did I miss" option.

At step 516, based on the retrieved user profile, the system may prompt for catch-up options for the returning user to select to catch up with another present user who is also consuming the same program. For example, as shown in FIG. 3C, the system may cause the User C's mobile device 310 to display catch-up options for the User C to select. In some cases, the system may cause the display device to overlay these catch-up options on the scenes displayed on the screen of the display device, and the selection may be made by any of the other users in the room (e.g., User A, User B, etc.).

The User C may select one of the catch-up options. In some cases, a user may be assigned a unique button on a remote control of a display device. The unique button may be associated with the user's viewing preferences, and may automatically cause a predetermined catch-up option to be performed for the returning User C. For example, the User C's viewing preferences may indicate that the User C prefers to select option (1) as shown in FIG. 3C and that the User C's preferred rewinding speed is 5×. If the returning User C presses the unique button assigned to the returning User C, the system may execute option (1) with rewinding speed of 5×. Different users may be assigned with different buttons on the remote control of the display device, respectively.

At step 518, a determination may be made as to whether the returning user selected a rewind catch-up option to rewind the program to the returning user's stop marker. This may occur if, for example, Users A and B agree to rewatch portions of the program that User C missed, to allow User C to catch up.

If the system receives user input indicating that the returning user has selected the rewind catch-up option, the process may proceed to step 520. At step 520, the system may rewind the program on the display to the last stop marker of the returning user. For example, as shown in FIG. 3D, the system may cause the display device to rewind the video program to the beginning of scene 2 (e.g., the last stop marker for the User C), and the display device may start to display the video program from the beginning of the scene 2.

If users watch a same program on different devices respectively (e.g., the User A watches the video program on the User A's mobile device, the User B watches the video program on the User B's mobile device, and the User C watches the video program on the display device), the system may cause one or more of the User A's mobile device and the User B's mobile device to rewind the program to the User C's last stop marker. In this manner, the multiple users may still enjoy a synchronized group viewing experience via their different devices.

The stop marker of the returning user may point to the middle of an advertisement inserted in the program. In these cases, the system may adjust the stop marker to point to the end of the advertisement. The system may rewind the program to the end of the advertisement, and the returning user may skip the advertisement while the returning user watches the missed part of the program. Alternatively, the system may adjust the stop marker to point to a beginning of the advertisement, or to an alternative advertisement, to ensure that the returning user still views an advertisement after they return.

At step 522, the system may update the user profiles for the users in the current viewing session, e.g., updating the user's current viewing progress point of the program, the farthest viewing progress point of the program, etc., to reflect the fact that the program has been rewound. For example, as shown on FIG. 3D, the system causes the display device to rewind the video program to the last stop marker (e.g., the beginning of the scene 2) of the returning user (e.g., the User C), and the current viewing progress points of the current program of all the users may be updated and return to the beginning of the scene 2. As the program goes on, the current viewing progress points of all the users may be continuously updated and point to the frame that the users are currently watching, so that the user's viewing progress may be continuously tracked and kept up-to-date in the profile.

At step 524, a determination may be made as to whether the returning user selected a synopsis catch-up option to display a synopsis of what the returning user missed. If the returning user selects the synopsis catch-up option, the process may proceed to step 526.

At step 526, the system may cause the device (e.g., the display device) on which users (e.g., the returning user and other users) are consuming the program to split the display screen and to use one part of the display to present a synopsis of what the returning user missed. For example, as shown on FIG. 3E, if the User C (e.g., the returning user) selects the synopsis catch-up option, the system may cause the display device 300 to split the screen of the display device 300 into a sub-screen (1) 330 and a sub-screen (2) 340. The display device may display the scene 3 on the sub-screen (1) 330, and display a synopsis of the scene 2 or highlighted parts of the scene 2 on the sub-screen (2) 340. In some cases, the system may need not cause the display device 300 to split the display screen, but may continue to display the scene 3 (which other users are watching) on the entire screen of the display device and overlay the synopsis of the scene 2 over the scene 3. The returning user may then review the synopsis and understand what he/she missed, while also continuing to watch the current program progress with the other users.

At step 528, similar to step 522, the system may update the user profiles, e.g., the user's current viewing progress point of the program, the farthest viewing progress point of the program, etc.

At step 530, a determination may be made as to whether the returning user selected a forwarding catch-up option to send what the returning user has missed to another device associated with the returning user for display.

If it is determined that the returning user selects the forwarding catch-up option, the system may proceed to step 532 in which the system may send, to another device associated with the returning user, the program portion(s) that the returning user has missed. For example, as shown on FIG. 3F, the system may send the scene 2 (what the returning User C missed during the User C's absence) to the User C's mobile device 310 (e.g., a device different from the display device with which the User A and the User B are consuming the program). The system may send the scene 2 of the program to the User C's mobile device 310 for display. The returning user may select any device associated with the premises 102a, and the system may send what the returning user has missed to the selected device for display. The returning user may then catch up to the others in the room by watching the missed portion on their own device while also watching the current portion on the main display.

At step 534, similar to steps 522 and 528, the system may update the user profiles, e.g., the user's current viewing progress point of the program, the farthest viewing progress point of the program, etc. The system may also update the user's device information of device(s) with which the user consumes a corresponding program by adding the another device to which the system forwards what the user has missed.

If it is determined that the returning user does not select any of the catch-up options discussed above, the system may determine that the returning user does not wish to view what the returning user has missed during the returning user's absence. The process may proceed to step 536. At step 536, similar to steps 522, 528, and 534, the system may update the user profiles, e.g., the user's current viewing progress point of the program, the farthest viewing progress point of the program, etc. The returning user's profile may still indicate the missed portions (e.g., via the resume and stop markers), so if the returning user wishes to review the missed portions at some later time, the user may do so by simply requesting to view the missed portions. The system may automatically retrieve the missed portions and present them to the user.

At step 538, the system may determine whether there are any missing users. A missing user may be a user who started watching a program together with other user, but is no longer consuming the program (e.g., a user who has stepped away to take a break, and is determined to no longer be among the group that is currently watching, wherein the user previously was among that group). A missing user may be one who just recently left the room, or a user who is not present when another user decides to resume watching a show that the users were previously watching together. If the system determines that one of the users, who previously was watching the program, is not consuming the program and/or is not present in front of any devices associated with the premises 102a and any devices associated with the one of the multiple users, the system may determine that there is a missing user in viewing the program. A departure point may also be determined for the missing user—the departure point may indicate the user's last viewed portion of the program, such as a latest stop point or farthest point in Table 1 above.

If it is determined that there is a missing user, the process may proceed to steps 539-552 where the system may track the viewing progress (or lack thereof) of the missing user and one or more other users who are present and viewing the program, and may provide alerts and options to help the users remain synchronized in their viewing.

At step 539, a "Follow Me" function may be implemented if such a function has been selected by the missing user. The system may determine that the user has activated the "Follow Me" function. With the "Follow Me" function being activated, the user may continuously watch the program if the user switches to another device without manually activating another device. For example, the user may start watching a program on a display device in Room 1 for 30 minutes. The user may then move to Room 2 where a refrigerator integrated with a display device is located, and the display device integrated to the refrigerator is in a sleep mode. The system may receive presence data, from the display device integrated to the refrigerator, indicating that the user is present in front of the display device integrated to the refrigerator. Based on the presence data, the system may determine, even without receiving a program request from the display device integrated to the refrigerator, that the user wants to continue to consume the program with the display device integrated to the refrigerator. The system may send wake-up signals to the display device integrated to the refrigerator and activate the display device integrated to the refrigerator. The system may send the program, from where the user just left, to the display device integrated to the refrigerator for display. After being activated, the "Follow Me" option may remain active until the user's farthest viewing progress point reaches the end of the program.

At step 540, the system may compare the current viewing progress point of a present user with the farthest viewing progress point of the missing user, to determine whether the present user is about to pass the farthest viewing progress point of the missing user.

If this is not the case—e.g., if it is determined that the farthest viewing progress point of the present user is behind (e.g., not approaching, or not equaling, or not passing) the farthest viewing progress point of the missing user, the system may proceed to step 542 in which the system may provide a "Catch Up" option for the present user to catch up with the missing user. As shown in FIG. 4C, the system may compare the farthest viewing progress point (e.g., the end of the scene 1) of the User A (e.g., the present user) and the farthest viewing progress point (e.g., the end of the scene 3) of the User B (e.g., the missing user), and may determine that the User A is 2 scenes (e.g., the scene 2 and the scene 3) behind the User B. The system may cause the display device to display an indication that the User A is 2 scenes behind the User B. The system may case the display device to list the scene 2 and the scene 3 to show what the User A needs to view to catch up with the User B. The system may cause the display device to show a "Catch Up" button. If the User A clicks on the "Catch-Up" button, the system may cause the display device to display the video program from the beginning of the scene 2 to the end of the scene 3. If the User A chooses to continue to watch the video program on the User A's mobile device (instead of the display device 300), the system may cause the User A's mobile device (instead of the device 300) to display the indication that the User A is two scenes behind the user B and the "Catch Up" button. Accordingly, the system may send data representing the scene 2 and the scene 3 to the User A's mobile device for display.

The process may proceed to step 544 where the system may update the user profile to indicate the user's progress in viewing the program, e.g., the user's current viewing progress point of the program, the portions that the user watched, the portions that the user skipped, etc.

If, in step 540, it is determined that the current viewing progress point of the present user(s) is about to pass the farthest viewing progress point of the missing user, the system may proceed to step 546. This may occur, for example, if a user (a "present" user currently watching a program) decides to resume watching a program that the user previously started watching with one or more other users who are not currently present. At step 546, the system may display a warning indicating that the that current viewing progress point of the present user is about to pass the farthest viewing progress point of the missing user. For example, as shown in FIG. 4E, if the system determines that the current viewing progress point (e.g., the end of the scene 3) of the User A (e.g., the present user) is about to pass the farthest viewing progress point (e.g., the end of the scene 3) of the User B (e.g., the missing user), the system may cause the display device to display a warning. The system may cause the device that the present user is using to consume the program to display the warning. As such, the system may synchronize the viewing progresses of multiple users and avoid spoilers.

The process may proceed to step 548 where the system determines whether the system receives user input indicating that the present user chooses to stop at the farthest viewing progress point of the missing user.

If the present user chooses to stop at the farthest viewing progress point of the missing user, the process may proceed to step 550. At step 550, the system may cause the display device to stop displaying the program, and may update the user profile for the present user(s). The system may also send a message (e.g., text message, email, etc.) to the missing user(s), alerting them that their friends have stopped their viewing progress, as this may facilitate resuming a group viewing experience. As shown on FIG. 4E, the system may add a stop marker (e.g., A2) for the User A to indicate that the User A stops consuming the program at A2. The message may indicate the present user, the program title, the stop point of the present user, the difference between the stop point of the present user (e.g., the progress of the present user) and the progress of the message recipient, and may provide options for a further group viewing session. In some cases, the message may comprise a future viewing date/time, proposed by the present user, for the viewing group (e.g., including the missing user(s) and the present user(s)) to resume watching the program together, and options (e.g., one or more of options of "Agree," "Disagree," and "Proceed without me") for the message recipient to select. If the missing user chooses the "Agree" option, the system may save the future viewing date/time and send out a reminder, prior to the future viewing date/time, to each of the users in the viewing group to remind them to resume watching the program on the future viewing date/time. If the missing user chooses the "Disagree" option, the system may send the missing user a message asking the missing user to propose a different future viewing date/time, and forward the different future viewing date/time to the present user. After the viewing group agrees to a future viewing date/time, the system may save the future viewing date/time and send out a reminder, prior to the future viewing date/time, to each of the users in the viewing group to remind them to resume watching the program on the future viewing date/time. If the missing user chooses the "Proceed without me" option, the system may send a message to the present user to inform the present user that he may resume watching the program anytime he prefers.

In some other cases, after it is determined that the present user has chosen to stop at the farthest viewing progress point of the missing user, the system may present a shared screen to each of the users in the viewing group to select a future viewing date/time so that the viewing group can resume watching the program together on the selected future viewing date/time. The shared screen may comprise an interactive user interface. A user of the viewing group may propose a future viewing date/time via the interactive user interface, and the system may send other users in the viewing group the proposed future viewing date/time and options (e.g., one or more of "Agree," "Disagree," and "Proceed without me") for the other users to select. The options of "Agree," "Disagree," and "Proceed without me" here may be similar to the options of "Agree," "Disagree," and "Proceed without me" discussed above. Via the shared screen, the viewing group may agree to a future viewing date/time to resume watching the program together. Accordingly, the system may facilitate the viewing group getting together again to resume watching.

If the present user chooses not to stop at the farthest viewing progress point of the missing user, the process proceeds to step 552. At step 552, the system may update the present user's current viewing progress point of the program, the farthest viewing progress point of the program, and the other progress data discussed above.

At step 554, the system may determine if a user falls asleep when the user is watching a program. If the user falls asleep, an eye tracking system may determine that the user has closed the eyes for more than a threshold time period (e.g., 30 seconds). For example, if the eye tracking system determines that the user's eyes have been closed for more than 30 seconds, the display device may determine that the user has fallen asleep and has stopped watching the program.

If the eye tracking system determines that the user has fallen asleep, the process may proceed to step 556. At step 556, the eye tracking system may send, to the system, data indicating that the user's eyes have been closed for more than the threshold time period (or simply data to cause the system to stop displaying the program). Based on the received data, the system may cause the display device that is displaying the program to stop displaying the program.

At step 558, the user profile may be updated. For example, the system may add a stop marker for the user. The stop marker may indicate the last scene (or frame, or time point, etc.) that the sleeping user watched. This stop marker may, for example, indicate a point in the program that is 30 seconds prior to the time the determination was made in step 554.

The system may continuously determine if there is a returning user (another user different from the user who has fallen asleep) when the user is in sleep. If the system determines that there is a returning user, the process may return to step 512.

At step 560, the eye tracking system may determine if the user wakes up (e.g., reopens his or her eyes). If the eye tracking system determines that the user reopens their eyes, the process may proceed to step 562. At step 562, the eye tracking system may send data causing the system to resume display of the program. The system may cause the display device to resume display of the program from the stop marker at which the user fell asleep.

At step 564, the user profile may be updated. For example, the system may update the user's progress (e.g., the resume marker, the current viewing progress point of the program, the farthest viewing progress point of the program, etc.). At step 566, the system may continue to cause display of the program on the device in front of which the user is present, and may determine whether the current viewing progress point of the user reaches the end of the program. If the current viewing progress point of the user reaches the end of the program, the process may proceed to step 568 in which the system may update the user's progress (e.g., current viewing progress point of the program, the farthest viewing progress point of the program, etc.). Separate progress information may be maintained for different programs, so reaching the end of one program may cause the system to create a new progress bar for whatever the next program is. If the current viewing progress point of the user does not reach the end of the program, the process may return to step 502 where the system continuously recognizes registered users.

The system may use the profile information to assist in managing storage of recorded programs. For example, if a user selects to delete a recorded program, but another user has not watched the program yet (or has only watched part of it), then the system may prevent the deletion of the recording (or at least provide a warning prior to deletion). The system may determine whether all the users have consumed the entire program. If not all the users have consumed the entire program, the system may prevent the recording of the program from being deleted from the device(s) with which one or more of the users have used to consume the program. For example, in the example of FIGS. 4A-4F, before the User A and the user B have viewed the entire video program, if one of the users sends a delete request to the system to delete the recording of the program from the display device, the system may deny the deletion request. After the system receives the delete request, the system may retrieve the farthest viewing progress point of the User A and the farthest viewing progress point of the User B. If the system determines that not both of the users' farthest viewing progress points of the program reach the end of the program, the system may deny the deletion request and prevent the program from being deleted.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting. For example, the step 538 may occur prior to step 512.

The invention claimed is:

1. A method comprising:
   determining, by a computing device, a plurality of users associated with a group viewing session of a content item;
   after determining that a first user, of the plurality of users, has left the group viewing session, storing information indicating a departure point, in the content item, associated with the first user leaving the group viewing session;
   monitoring progress, of the content item, of one or more remaining users of the plurality of users;
   after determining that the first user has returned to the group viewing session, presenting an option to display a summary of a portion of the content item that the first user missed after leaving the group viewing session; and
   causing display of a message indicating a difference between a viewing progress of the first user and a viewing progress of a second user of the plurality of users.

2. The method of claim 1, further comprising:
   presenting an option to rewind the content item to the departure point.

3. The method of claim 1, further comprising:
   after determining that the first user has returned to the group viewing session, presenting a plurality of options to allow the first user to catch up with the progress of the one or more remaining users.

4. The method of claim 1, further comprising:
causing a split-screen display of the group viewing session, wherein the split-screen display comprises:
a first screen portion allowing the one or more remaining users to continue watching the content item without rewinding to the departure point, and
a second screen portion providing the first user with the summary of the portion of the content item that the first user missed.

5. The method of claim 1, wherein the option comprises an option to display video clips, from the portion of the content item that the first user missed, accompanying the summary.

6. The method of claim 1, wherein the option comprises:
an option to display the content item on a second display device different from a first display device on which the group viewing session is displayed.

7. The method of claim 1, further comprising:
causing display of a warning indicating that a viewing progress of the first user approaches a viewing progress of a second user of the plurality of users.

8. The method of claim 1, further comprising:
based on a determination that the first user is located within a predetermined distance from a second display device different from a first display device on which the group viewing session is displayed, activating the second display device; and
causing display of the content item on the second display device.

9. The method of claim 1, wherein the group viewing session of the content item comprises the plurality of users watching the content item displayed on a same display device.

10. A method comprising:
determining, by a computing device, a first user is viewing a content item;
monitoring a viewing progress, of the content item, of the first user;
determining a stopping point, in the content item, of the first user;
monitoring a viewing progress, of the content item, of a second user;
causing display of a message indicating a difference between the viewing progress of the first user and the viewing progress of the second user; and
while the second user is viewing the content item, causing display of a warning indicating that the viewing progress of the second user is approaching the stopping point of the first user.

11. The method of claim 10, wherein the warning comprises a text message.

12. The method of claim 10, further comprising:
causing display of an option to catch up with the viewing progress of the first user.

13. The method of claim 10, further comprising:
based on a determination that the first user is located within a predetermined distance from a second display device different from a first display device on which the content item is displayed, causing the second display device to display the content item.

14. The method of claim 10, further comprising:
determining a plurality of users, including the first user, who are associated with a group viewing session of the content item;
after determining that the first user has left the group viewing session, monitoring viewing progress, of the content item, of one or more remaining users of the plurality of users; and
after determining that the first user has returned to the group viewing session, presenting a plurality of options to allow the first user to catch up with the viewing progress of the one or more remaining users.

15. The method of claim 14, wherein the plurality of options comprises one or more of:
an option to rewind the content item to where the first user has left the group viewing session;
an option to display a text summary of a portion of the content item that the first user missed after leaving the group viewing session; or
an option to display the content item on a second display device different from a first display device on which the content item is displayed.

16. A method comprising:
after determining that a first user, of a group viewing session, has left the group viewing session, determining a departure point, in a content item, associated with the first user leaving the group viewing session;
monitoring progress, of the content item and after the first user left the group viewing session, of one or more remaining users of the group viewing session; and
after determining that the first user has returned to the group viewing session:
causing display of a message indicating a difference between a viewing progress of the first user and a viewing progress of a second user of the group viewing session, and
presenting an option to rewind the content item, for the group viewing session, to the departure point.

17. The method of claim 16, further comprising:
after determining that the first user has returned to the group viewing session, presenting an option to display a text summary of a portion of the content item that the first user missed after leaving the group viewing session.

18. The method of claim 16, further comprising:
after determining that the first user has returned to the group viewing session, presenting an option to display the content item on a second display device different from a first display device on which the group viewing session is displayed.

19. The method of claim 1, wherein the option provides an option to display, with the summary, video frames that represent summary of content of the portion of the content item that the first user missed.

* * * * *

UNITED STATES PATENT AND TRADEMARK OFFICE
CERTIFICATE OF CORRECTION

PATENT NO. : 11,184,672 B2
APPLICATION NO. : 16/673155
DATED : November 23, 2021
INVENTOR(S) : Daw et al.

It is certified that error appears in the above-identified patent and that said Letters Patent is hereby corrected as shown below:

In the Specification

Column 11, Detailed Description, Line 65:
Delete "B1 (A2)." and insert --B1(A2).-- therefor Column 11, Detailed Description, Line 66:
Delete "B1 (A2)" and insert --B1(A2)-- therefor Column 15, Detailed Description, Lines 27-28:
Delete "P 1." and insert --P1.-- therefor Column 16, Detailed Description, Line 16:
Delete "di splay" and insert --display-- therefor Signed and Sealed this
Sixth Day of June, 2023

Katherine Kelly Vidal
*Director of the United States Patent and Trademark Office*